(12) United States Patent
Li

(10) Patent No.: US 8,159,757 B2
(45) Date of Patent: Apr. 17, 2012

(54) ZOOM LENS

(75) Inventor: Dayong Li, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 24 days.

(21) Appl. No.: 12/823,425

(22) Filed: Jun. 25, 2010

(65) Prior Publication Data

US 2011/0043926 A1    Feb. 24, 2011

(30) Foreign Application Priority Data

Aug. 18, 2009 (JP) ................. 2009-189203
Aug. 18, 2009 (JP) ................. 2009-189204
Aug. 18, 2009 (JP) ................. 2009-189205

(51) Int. Cl.
G02B 15/14 (2006.01)

(52) U.S. Cl. ........ 359/687; 359/683; 359/684; 359/685; 359/715; 359/740; 359/774

(58) Field of Classification Search .................. 359/687, 359/683–685, 715, 740, 774
See application file for complete search history.

(56) References Cited

U.S. PATENT DOCUMENTS

2005/0243437 A1   11/2005   Hozumi et al.
2009/0174950 A1 *  7/2009   Hankawa et al. ............. 359/687

FOREIGN PATENT DOCUMENTS

JP   2008-176230 A   7/2008
JP   2008-185782 A   8/2008

* cited by examiner

Primary Examiner — Evelyn A. Lester
(74) Attorney, Agent, or Firm — Foley & Lardner LLP

(57) ABSTRACT

A zoom lens includes, sequentially from an object side, a positive first lens group; a negative second lens group; a positive third lens group; and a positive fourth lens group, where $2.0 \leq D23W/FW \leq 3.0$ is satisfied. D23W is an interval, at a wide angle edge, between a lens that among lenses of the second lens group, is farthest on an imaging plane side and a lens that among lenses of the third lens group, is farthest on the object side. FW is a focal length of an optical system of the zoom lens at infinity focus, at the wide angle edge.

10 Claims, 18 Drawing Sheets

ZOOM LENS

CROSS-REFERENCE TO RELATED APPLICATIONS

The present document incorporates by reference the entire contents of Japanese priority document, 2009-189203, 2009-189204 and 2009-189205 filed in Japan on Aug. 18, 2009.

BACKGROUND OF THE INVENTION

1. Field of the Invention

The present invention relates to a zoom lens.

2. Description of the Related Art

In recent years, further reductions in size and increased power are demanded of digital cameras and the like. To address these demands, a compact, high power zoom lens is proposed in Japanese Patent Application Laid-Open Publication Nos. 2008-176230 and 2008-185782, for example.

The zoom lenses recited in Japanese Patent Application Laid-Open Publication Nos. 2008-176230 and 2008-185782 are high power zoom lenses that include at least 4 lenses, a positive lens, a negative lens, and two positive lenses, sequentially from an object side. In particular, the zoom lens recited in Japanese Patent Application Laid-Open Publication No. 2008-176230 realizes an angle of view that exceeds 77° at the wide angle edge and a zoom ratio of approximately 9.4. Further, the zoom lens recited in Japanese Patent Application Laid-Open Publication No. 2008-185782 realizes an angle of view that exceeds 61° at the wide angle edge and a zoom ratio of approximately 9.5.

Although the zoom lenses recited in Japanese Patent Application Laid-Open Publication Nos. 2008-176230 and 2008-185782 achieve zoom ratios of 9 or greater, the zoom lenses have a relatively large lens diameter and thus, are not applicable to imaging apparatuses for which greater compactness is demanded. Furthermore, the angle of view is less than 80°, which is narrow and insufficient.

Moreover, the size of the zoom lenses when retracted is too large for application to imaging apparatuses for which reductions in size are demanded. In addition, it cannot be said that the optical performance of these lenses is sufficient.

SUMMARY OF THE INVENTION

It is an object of the present invention to at least solve the above problems in the conventional technologies.

A zoom lens according to one aspect of the present invention includes, sequentially from an object side, a positive first lens group; a negative second lens group; a positive third lens group; and a positive fourth lens group, where $2.0 \leq D23W/FW \leq 3.0$ is satisfied. D23W is an interval, at a wide angle edge, between a lens that among lenses of the second lens group, is farthest on an imaging plane side and a lens that among lenses of the third lens group, is farthest on the object side. FW is a focal length of an optical system of the zoom lens at infinity focus, at the wide angle edge.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
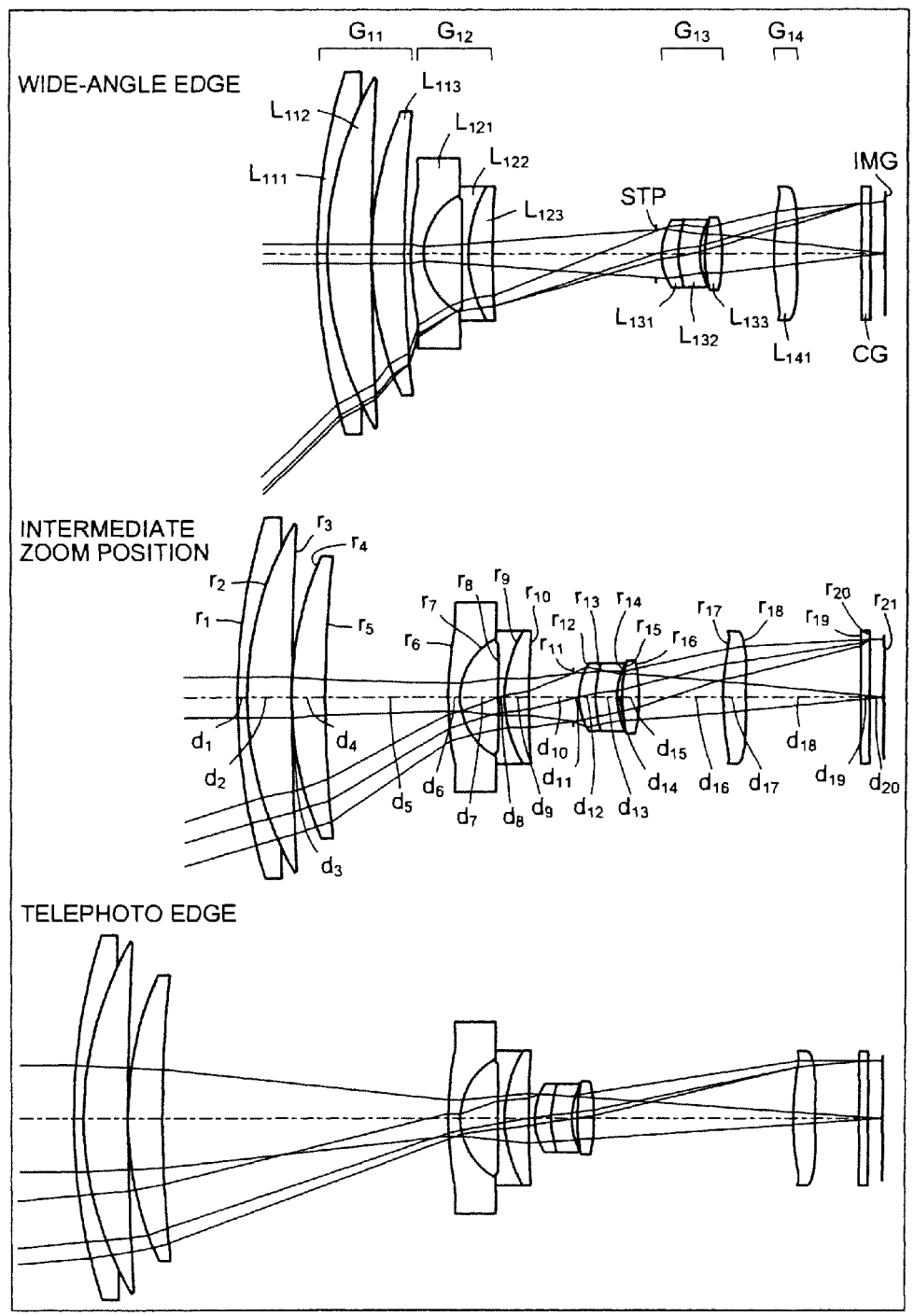
FIG. 1 is a cross sectional view (along an optical axis) of a zoom lens according to a first example.

Referring to the accompanying drawings, exemplary embodiments according to the present invention are explained in detail below.

A zoom lens according to an embodiment includes sequentially from the object side, a positive first lens group, a negative second lens group, a positive third lens group, and a positive fourth lens group. The zoom lens zooms from a wide angle edge to a telephoto edge by moving the first to the third lens groups along the optical axis. Further, the zoom lens corrects imaging plane (image location) variation accompanying zoom and focuses the image by moving the fourth lens group along the optical axis.

One object of the present invention is to provide a compact zoom lens that has a wide angle of view and high optical performance and that is capable of high zoom ratios.

Another object of the present invention is to provide a high power zoom lens that has a wide angle of view and with respect to a retracted state, has a thinner size than a conventional zoom lens. To achieve such objects, various conditions are set below.

The zoom lens according to the embodiment preferably satisfies the following conditional expression, where in the zoom lens, at the wide angle edge, an interval between the lens that among the lenses of the second lens group, is farthest on the imaging plane side and the lens that among the lenses of the third lens group, is farthest on the object side is D23W and the focal length (infinity focus) of the entire optical system at the wide angle edge is FW.

$$2.0 \leq D23W/FW \leq 3.0 \qquad (1)$$

Conditional expression (1) prescribes a condition to reduce the effective diameter of the first lens group while ensuring a wide angle of view of 80° or greater at the wide angle edge. Satisfaction of conditional expression (1) enables a wide angle of 80° or greater to be achieved together with a reduced aperture of the first lens group. Below the lower limit of conditional expression (1), although the effective diameter of the first lens group becomes smaller, achieving a smaller aperture of the first lens group, the maintenance of a wide angle of view of 80° or greater becomes difficult. On the other hand, beyond the upper limit of conditional expression (1), the effective diameter of the first lens group becomes large at the wide angle edge, making reduction of the aperture of the first lens group difficult.

The zoom lens according to the embodiment preferably satisfies the following conditional expression, where the focal length of the first lens group is F1 and the focal length of the second lens group is F2.

$$5.7 \leq |F1/F2| \leq 10 \quad (2)$$

Conditional expression (2) prescribes a condition to reduce the effective diameter of the first lens group, increase the angle of view at the wide angle edge, and maintain high optical performance over the entire zoom range. Below the lower limit of conditional expression (2), although high optical performance can be maintained, the effective diameter of the lens group becomes difficult to decrease and the wide angle becomes difficult to increase. On the other hand, beyond the upper limit of conditional expression (2), although the power of the second lens group becomes strong, facilitating reduction of the aperture of the first lens group and increase of the angle of view, the correction of various types of aberration becomes difficult.

The zoom lens according to the embodiment preferably satisfies the following conditional expression, where the total length (distance from the surface farthest on the object side to the imaging plane) of the optical system, at the wide angle edge is TaW, the total length (distance from the surface farthest on the object side to the imaging plane) of the optical system, at the telephoto edge is Tat, the half angle of view of the optical system, at the wide angle edge is ωW, and the maximum paraxial image height at the wide angle edge is Ymax.

$$15 \leq (TaW + TaT)/(\tan(\omega W) \times Y\text{max}) \leq 33 \quad (3)$$

Conditional expression (3) prescribes a condition to reduce the aperture of the first lens group and maintain an angle of view of 80° or greater at the wide angle edge while realizing a zoom ratio of 8 or greater. Below the lower limit of conditional expression (3), although the aperture of the first lens group can be reduced and the angle of view at the wide angle edge can be increased, a zoom ratio of 8 or greater becomes difficult to realize. On the other hand, beyond the upper limit of conditional expression (3), although a zoom ratio of 8 or greater can be achieved, reduction of the aperture of the first lens group and increase of the angle of view at the wide angle edge become difficult to realize.

As described, by satisfying conditional expression (1), the zoom lens according to the embodiment has a small aperture while being able to maintain a wide angle of view of 80° or greater. Further, by satisfying conditional expression (2), the zoom lens is compact and has a wide angle of view while being able to maintain high optical performance over the entire zoom range. Additionally, by satisfying conditional expression (3), the zoom lens is able to be compact, have a wide angle of view and a high zoom ratio.

Favorable results can be expected by satisfying any one of the conditional expressions above, as described. Nonetheless, satisfaction of more than one of the conditional expressions above, as compared to satisfaction of only one condition expression, further improves results.

Furthermore, the zoom lens according to the embodiment preferably satisfies the following conditional expression, where a total thickness along the optical axis of the lens groups is ΣD, the half angle of view of the optical system, at the wide angle edge is ωW, and the maximum paraxial image height at the wide angle edge is Ymax.

$$3.5 \leq \Sigma D/(\tan(\omega W) \times Y\text{max}) \leq 5.5 \quad (4)$$

Conditional expression (4) prescribes a condition for a suitable total thickness along the optical axis of the lens groups to achieve a thinner retracted-state size, while providing for a wide angle of view of 80° or greater. Satisfaction of conditional expression (4) enables both an angle of view of 80° or greater and a thinner retracted-state size. Below the lower limit of conditional expression (4), such a thin lens thickness is called for the lens groups that lens processing becomes difficult. Further, such a wide angle of view is called for that aberration correction for the angle of view becomes difficult. On the other hand, beyond the upper limit of conditional expression (4), the total thickness of the lens groups becomes too large, making a thinner retracted-state size difficult to achieve.

The zoom lens according to the embodiment preferably satisfies the following conditional expression, where the focal length of the second lens group is F2, the focal length of the third lens group is F3, and the focal length (infinity focus) of the entire optical system at the wide angle edge is FW.

$$8.0 \leq |F2 \times F3|/FW \leq 15 \quad (5)$$

Conditional expression (5) prescribes a condition to maintain an angle of view of 80° or greater at the wide angle edge, while achieving a thinner retracted-state size and a high zoom ratio. Below the lower limit of conditional expression (5), although an angle of view of 80° or greater at the wide angle edge can be maintained and a thinner retracted-state size can be achieved, the refractive power of the second lens group and of the third lens group becomes too strong, making the correction of various types of aberration difficult. On the other hand, beyond the upper limit of conditional expression (5), the refractive power of the second lens group and of the third lens group becomes too weak. If the realization of a high zoom ratio is attempted under such conditions, displacement of the second lens group and of the third lens group has to be increased, which means that the cam barrel for moving the lens groups has to be lengthened, whereby a thinner retracted-state size becomes difficult to realize. Furthermore, if the refractive power of the second lens and of the third lens is weak, an angle of view of 80° or greater at the wide angle edge becomes difficult to achieve.

The zoom lens according to the embodiment preferably satisfies the following conditional expression, where the focal length of the second lens group is F2, a thickness along the direction of the optical axis of the second lens group is D2, and the maximum paraxial image height at the wide angle edge is Ymax.

$$5.0 \leq |F2 \times D2|/Y\text{max} \leq 10 \quad (6)$$

Conditional expression (6) prescribes a condition for reducing the thickness of the second lens group and for a suitable refractive power of the second lens group to realize a greater angle of view and a thinner retracted-state size. Below the lower limit of conditional expression (6), the refractive power of the second lens group becomes too strong, making the correction of various types of aberration difficult, which is undesirable. On the other hand, beyond the upper limit of conditional expression (6), the refractive power of the second lens group becomes too weak, making an angle of view of 80° or greater difficult to achieve. Further, the thickness of the second lens group becomes thick, making a thinner retracted-state size difficult to realize.

As described, the zoom lens according to the embodiment, in addition to maintaining a wide angle of view, is able to realize a thinner retracted-state size and a high zoom ratio. For example, satisfaction of conditional expression (4) obtains a suitable total thickness along the optical axis of the lens groups constituting the zoom lens and enables a wide angle of view (80° or greater) and a thinner retracted-state size to be realized. Furthermore, satisfaction of conditional expression (5) obtains a suitable refractive power for the second lens group and of the third lens group and enables a wide angle of view of 80° or greater while further enabling a thinner retracted-state size and a high zoom ratio to be achieved. In addition, satisfaction of conditional expression (6) enables a reduction in the thickness of the second lens group, obtains a suitable refractive power for the second lens group, and enables an increase of the angle of view and a thinner retracted-state size.

Favorable results can be expected by satisfying any one of the conditional expressions above, as described. Nonetheless, satisfaction of more than one of the conditional expressions above, as compared to satisfaction of only one condition expression, further improves results.

In the zoom lens according to the embodiment, the first lens group includes plural positive lenses. The zoom lens preferably satisfies the following conditional expression, where with respect to the d-line of the positive lenses of the first lens group, the average Abbe number is $\lambda dP1$ and the average refractive index is $NdP1$.

$$25 \leq \lambda dP1/NdP1 \leq 35 \quad (7)$$

Condition expression (7) prescribes a condition to maintain an angle of view of 80° or greater at the wide angle edge, reduce the thickness of the first lens group and achieve satisfactory correction of chromatic aberration of magnification at the telephoto edge of the zoom lens. Below the lower limit of conditional expression (7), although a reduction of the thickness of the first lens group is easily achieved, the correction of chromatic aberration of magnification with respect to long wavelengths (C-line) at the telephoto edge becomes difficult achieve. On the other hand, beyond the upper limit of conditional expression (7), the refractive index with respect to the d-line of the positive lenses in the first lens group has to be lowered and the Abbe number has to be increased. If maintenance of a suitable refractive power of the first lens group is attempted under such conditions, the thickness of the first lens group increases, making reductions in thickness difficult. Further, the correction of chromatic aberration of magnification with respect to short wavelengths (g-line) at the telephoto edge becomes difficult achieve.

In the zoom lens according to the embodiment, the second lens group includes plural negative lenses including sequentially from the object side, a first negative lens and a second negative lens. The zoom lens preferably satisfies the following conditional expression, where with respect to the d-line of the second negative lens, the Abbe number is $\lambda dM2$ and the refractive index is $NdM2$.

$$20 \leq \lambda dM2/NdM2 \leq 31 \quad (8)$$

Conditional expression (8) prescribes a condition to reduce the thickness of the second lens group and achieve satisfactory correction of chromatic aberration of magnification at the wide angle edge of the zoom lens. Below the lower limit of conditional expression (8), although a reduction in the thickness of the second lens group is easily achieved, the correction of longitudinal chromatic aberration at the telephoto edge becomes difficult. On the other hand, beyond the upper limit of conditional expression (8), in order to maintain an appropriate refractive power of the second lens group, the curvature of radius of the second negative lens has to be significantly increased, making a reduction in the thickness of the second lens group difficult. In addition, satisfactory correction of spherical aberration and astigmatism in the zoom lens, as well as chromatic aberration of magnification with respect to short wavelengths (g-line) at the wide angle edge become difficult.

In the zoom lens according to the embodiment, the third lens group includes plural positive lenses. The zoom lens preferably satisfies the following conditional expression, where with respect to the d-line of the positive lens that, among the lenses of the third lens group, is farthest on the object side, the Abbe number is $\lambda dP3$, and the refractive index is $NdP3$.

$$2 \leq (\lambda dM2/NdM2) - (\lambda dP3/NdP3) \leq 12 \quad (9)$$

Conditional expression (9) prescribes a condition to realize a high zoom ratio (8 or greater) while achieving satisfactory correction of chromatic aberration at the wide angle edge and at the telephoto edge. Below the lower limit of conditional expression (9), although the correction of chromatic aberration of magnification at the wide angle edge is easily achieved, the correction of longitudinal chromatic aberration at the telephoto edge becomes difficult. On the other hand, beyond the upper limit of conditional expression (9), although the correction of longitudinal chromatic aberration for short wavelengths at the telephoto edge is easily achieved, the correction of chromatic aberration of magnification at the wide angle edge becomes difficult.

Additionally, in the zoom lens according to the embodiment, the second lens group, in addition to the negative lenses, includes at least 1 positive lens having an aspheric surface on the imaging plane side. The zoom lens preferably satisfies the following conditional expression, where deviation of the paraxial curvature radius at a height that is 10% of the effective diameter of the aspheric surface and the aspheric shape is S10, and the height of 10% of the effective diameter is H10.

$$-0.1 < S10/H10 < -0.005 \quad (10)$$

Conditional expression (10) prescribes the aspheric shape of a positive lens in the second lens group. By adopting in the second lens group, a lens having an aspheric shape satisfying conditional expression (10), various types of aberration such as spherical aberration, astigmatism, and distortion can be corrected satisfactorily over the entire zoom range. Below the lower limit of conditional expression (10), the inflection point of the aspheric shape becomes prominent, making lens processing difficult and causing problems with lens manufacture. On the other hand, beyond the upper limit of conditional expression (10), a reduction in the size of the first lens group becomes difficult and sufficient correction of the various types of aberration cannot be achieved.

As described, satisfaction of conditional expression (7) maintains a wide angle of view of 80° or greater, reduces the thickness of the first lens group, and enables satisfactory correction of chromatic aberration of magnification at the telephoto edge of the zoom lens. Satisfaction of conditional expression (8) reduces the thickness of the second lens group and enables satisfactory correction of chromatic aberration of magnification at the wide angle edge of the zoom lens. Satisfaction of conditional expression (9) realizes a high zoom ratio (8 or greater), while achieving satisfactory correction of chromatic aberration at the wide angle edge and at the telephoto edge. In addition, satisfaction of conditional expression (10) enables further improvement of aberration correction. Satisfaction of each of the conditional expressions above enables the zoom lens according to the embodiment to maintain a wide angle of view and high optical performance and have a thinner retracted-state size and a high zoom ratio.

Favorable results can be expected by satisfying any one of the conditional expressions above, as described. Nonetheless, satisfaction of more than one of the conditional expressions above, as compared to satisfaction of only one conditional expression, further improves results.

FIG. 1 is a cross sectional view (along the optical axis) of a zoom lens according to a first example. The zoom lens includes, sequentially from a non-depicted object side, a positive first lens group $G_{11}$, a negative second lens group $G_{12}$, a positive third lens group $G_{13}$ and a positive fourth lens group $G_{14}$. Further, a diaphragm STP is disposed between the second lens group $G_{12}$ and the third lens group $G_{13}$. A cover glass CG (or filter) is disposed between the fourth lens group $G_{14}$ and an imaging plane IMG. The cover glass CG (or filter) is disposed as needed and may be omitted when not necessary. Further, at the imaging plane IMG, an optical receiving surface of an imaging element such as a CCD, a CMOS, etc. is disposed.

The first lens group $G_{11}$ includes sequentially from the object side, a negative lens $L_{111}$, a positive lens $L_{112}$, and a positive lens $L_{113}$. The negative lens $L_{111}$ and the positive lens $L_{112}$ are cemented together.

The second lens group $G_{12}$ includes sequentially from the object side, a negative lens $L_{121}$, a negative lens $L_{122}$, and a positive lens $L_{123}$. Both surfaces of the negative lens $L_{121}$ and a surface on the imaging plane IMG side of the positive lens $L_{123}$ are aspheric. Further, the negative lens $L_{122}$ and the positive lens $L_{123}$ are cemented together.

The third lens group $G_{13}$ includes sequentially from the object side, a positive lens $L_{131}$, a negative lens $L_{132}$, and a positive lens $L_{133}$. A surface on the object side of the positive lens $L_{131}$ is aspheric. Further, the positive lens $L_{131}$ and the negative lens $L_{132}$ are cemented together.

The fourth lens group $G_{14}$ includes a positive lens $L_{141}$. Both surfaces of the positive lens $L_{141}$ are aspheric.

The zoom lens zooms from the wide angle edge to the telephoto edge by moving the first lens group $G_{11}$, the second lens group $G_{12}$, and the third lens group $G_{13}$ along the optical axis. Furthermore, the zoom lens corrects imaging plane (image location) variation accompanying zoom and focuses the image, by moving the fourth lens group $G_{14}$ along the optical axis.

Various values related to the zoom lens according to the first example are indicated below.
Focal length of zoom lens system=4.365 (wide angle edge) to 13.109 (intermediate zoom position) to 41.178 (telephoto edge)
F number=3.58 (wide angle edge) to 4.84 (intermediate zoom position) to 5.75 (telephoto edge)
Angle of view (2ω)=87.6° (wide angle edge) to 33.6° (intermediate zoom position) to 10.56° (telephoto edge)

(Values Related to Conditional Expression (1))
At wide angle edge, interval between lens farthest on imaging plane side among lenses of the second lens group $G_{12}$ and lens farthest on object side among lenses of the third lens group $G_{13}$ (D23W)=11.532
D23W/FW=2.64
(Values Related to Conditional Expression (2))
Focal length of the first lens group $G_{11}$ (F1)=35.5194
Focal length of the second lens group $G_{12}$ (F2)=−5.8942
|F1/F2|=6.03
(Values Related to Conditional Expression (3))
Total length of optical system, at wide angle edge (TaW)= 38.5991
Total length of optical system, at telephoto edge (TaT)= 55.5311
Half angle of view of optical system, at wide angle edge (ωW)=43.80
Maximum paraxial image height at wide angle edge (Ymax)= 4.1858
(TaW+TaT)/(tan(ωW)×Ymax)=23.45
$r_1$=42.4567
  $d_1$=0.7000 $nd_1$=1.92286 $vd_1$=20.88
$r_2$=23.7410
  $d_2$=2.8893 $nd_2$=1.61800 $vd_2$=63.39
$r_3$=123.2525
  $d_3$=0.1500
$r_4$=24.3075
  $d_4$=2.2214 $nd_3$=1.88300 $vd_3$=40.80
$r_5$=72.0512
  $d_5$=0.5000 (wide angle edge) to 8.4947 (intermediate zoom position) to 19.7731 (telephoto edge)
$r_6$=18.2902 (aspheric surface)
  $d_6$=0.8000 $nd_4$=1.85135 $vd_4$=40.10
$r_7$=4.1413 (aspheric surface)
  $d_7$=2.6217
$r_8$=−104.4554
  $d_8$=0.4500 $nd_5$=1.74330 $vd_5$=49.22
$r_9$=8.5587
  $d_9$=1.6559 $nd_6$=2.00170 $vd_6$=19.32
$r_{10}$=31.8881 (aspheric surface)
  $d_{10}$=11.1821 (wide angle edge) to 3.0587 (intermediate zoom position) to 0.1871 (telephoto edge)
$r_{11}$=∞ (diaphragm)
  $d_{11}$=0.3500
$r_{12}$=4.4041 (aspheric surface)
  $d_{12}$=1.1356 $nd_7$=1.80611 $vd_7$=40.73
$r_{13}$=8.7508
  $d_{13}$=1.4251 $nd_8$=1.94595 $vd_8$=17.98
$r_{14}$=4.0934
  $d_{14}$=0.3433
$r_{15}$=10.1848
  $d_{15}$=1.1959 $nd_9$=1.61800 $vd_9$=63.39
$r_{16}$=−10.1848
  $d_{16}$=3.5000 (wide angle edge) to 5.7939 (intermediate zoom position) to 13.5388 (telephoto edge)
$r_{17}$=15.7815 (aspheric surface)
  $d_{17}$=1.5000 $nd_{10}$=1.55332 $vd_{10}$=71.67
$r_{18}$=−1000.0000 (aspheric surface)
  $d_{18}$=4.4707 (wide angle edge) to 7.8402 (intermediate zoom position) to 3.0627 (telephoto edge)
$r_{19}$=∞
  $d_{19}$=0.5000 $nd_{11}$=1.51680 $vd_{11}$=64.20

$r_{20}=\infty$ $d_{20}=1.0081$ (wide angle edge) to 1.0126 (intermediate zoom position) to 1.0311 (telephoto edge)

$r_{21}=\infty$ (image plane)

Constant of cone (k) and Aspheric coefficients (A, B, C, D)

(Sixth Plane)

K=0, $A=1.16028\times10^{-4}$, $B=-4.00446\times10^{-5}$,
$C=9.99964\times10^{-7}$, $D=-7.76320\times10^{-9}$ (Seventh Plane)

K=−0.1858, $A=6.53494\times10^{-4}$, $B=2.25949\times10^{-5}$,
$C=-7.88249\times10^{-6}$, $D=7.04313\times10^{-9}$ (Tenth Plane)

K=0, $A=-5.92227\times10^{-4}$, $B=4.38745\times10^{-6}$,
$C=1.94199\times10^{-7}$, $D=-1.48702\times10^{-9}$ (Twelfth Plane)

K=−0.5353, $A=9.52249\times10^{-6}$, $B=4.17341\times10^{-5}$,
$C=-8.84871\times10^{-6}$, $D=1.17972\times10^{-6}$ (Seventeenth Plane)

K=−1.6970, $A=-6.34973\times10^{-4}$, $B=3.53883\times10^{-5}$,
$C=-2.81373\times10^{-6}$, $D=3.86441\times10^{-8}$ (Eighteenth Plane)

Figure 2:
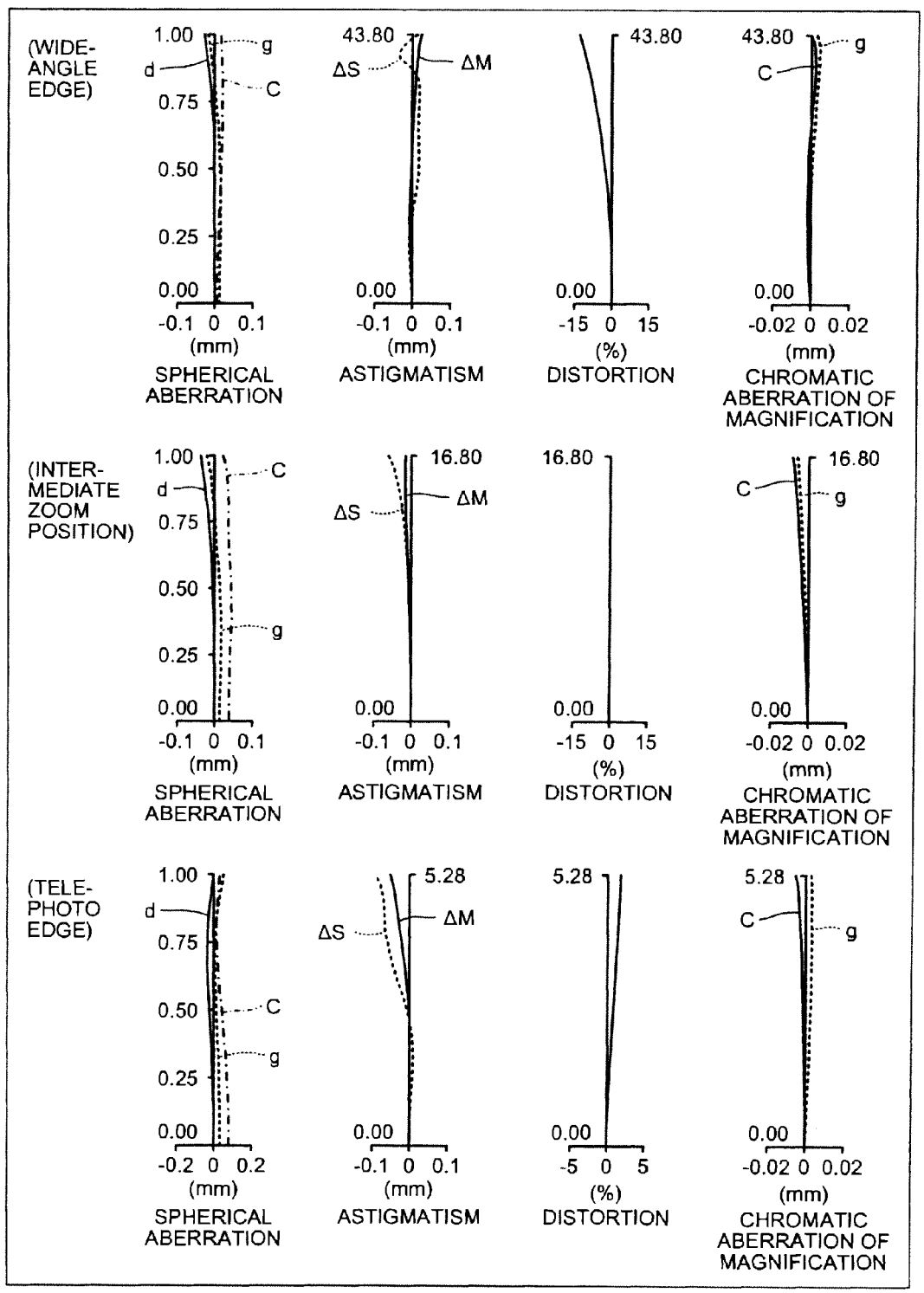
FIG. 2 is a diagram of various types of aberration of the zoom lens according to the first example.

K=0, $A=-6.44317\times10^{-1}$, $B=1.51939\times10^{-5}$,
$C=-1.68208\times10^{-6}$, $D=1.60171\times10^{-8}$ FIG. 2 is a diagram of various types of aberration of the zoom lens according to the first example. In the diagram "g", "d", and "c" respectively represent aberrations for wavelengths corresponding to g-line (λ=435.83 nm), d-line (λ=587.56 nm), and c-line (λ=656.27 nm). In a portion of FIG. 2 indicating astigmatism, ΔS and ΔM represent aberration with respect to a sagittal image plane and a meridional image plane, respectively.

Figure 3:
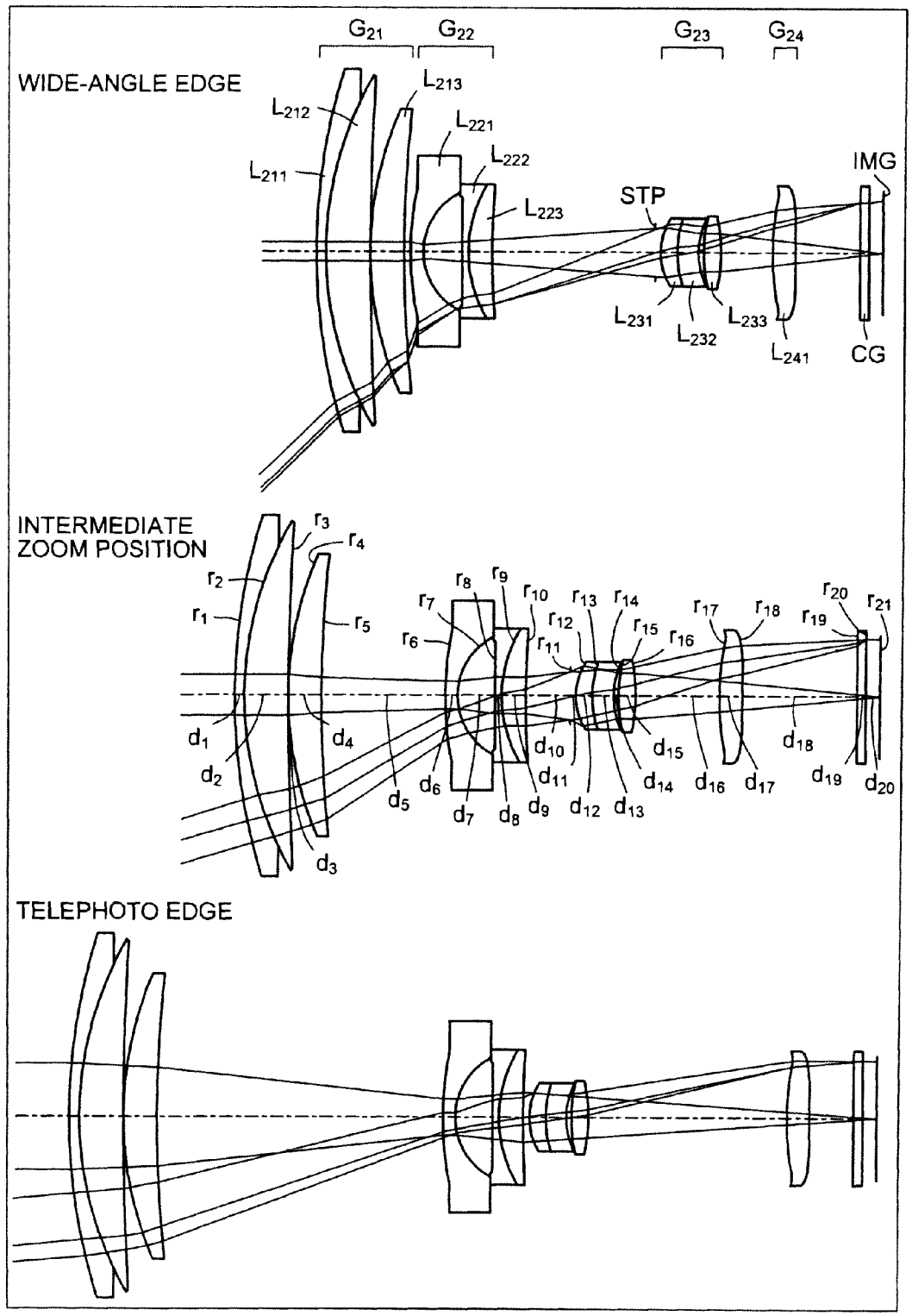
FIG. 3 is a cross sectional view (along the optical axis) of a zoom lens according to a second example.

FIG. 3 is a cross sectional view (along the optical axis) of a zoom lens according to a second example. The zoom lens includes, sequentially from the non-depicted object side, a positive first lens group $G_{21}$, a negative second lens group $G_{22}$, a positive third lens group $G_{23}$, and a positive fourth lens group $G_{24}$. Further, a diaphragm STP is disposed between the second lens group $G_{22}$ and the third lens group $G_{23}$. A cover glass CG (or filter) is disposed between the fourth lens group $G_{24}$ and the imaging plane IMG. The cover glass CG (or filter) is disposed as needed and may be omitted when not necessary. Further, at the imaging plane IMG, the optical receiving surface of an imaging element such as a CCD, a CMOS, etc. is disposed.

The first lens group $G_{21}$ includes sequentially from the object side, a negative lens $L_{211}$, a positive lens $L_{212}$, and a positive lens $L_{213}$. The negative lens $L_{211}$ and the positive lens $L_{212}$ are cemented together.

The second lens group $G_{22}$ includes sequentially from the object side, a negative lens $L_{221}$, a negative lens $L_{222}$, and a positive lens $L_{223}$. Both surfaces of the negative lens $L_{221}$ and a surface on the imaging plane IMG side of the positive lens $L_{223}$ are aspheric. Further, the negative lens $L_{222}$ and the positive lens $L_{223}$ are cemented together.

The third lens group $G_{23}$ includes sequentially from the object side, a positive lens $L_{231}$, a negative lens $L_{232}$, and a positive lens $L_{233}$. A surface on the object side of the positive lens $L_{231}$ is aspheric. Further, the positive lens $L_{231}$ and the negative lens $L_{232}$ are cemented together.

The fourth lens group $G_{24}$ includes a positive lens $L_{241}$. Both surfaces of the positive lens $L_{241}$ are aspheric.

The zoom lens zooms from the wide angle edge to the telephoto edge by moving the first lens group $G_{21}$, the second lens group $G_{22}$, and the third lens group $G_{23}$ along the optical axis. Furthermore, the zoom lens corrects imaging plane (image location) variation accompanying zoom and focuses the image, by moving the fourth lens group $G_{24}$ along the optical axis.

Various values related to the zoom lens according to the second example are indicated below.

Focal length of zoom lens system=4.378 (wide angle edge) to 13.059 (intermediate zoom position) to 40.991 (telephoto edge)

F number=3.58 (wide angle edge) to 4.88 (intermediate zoom position) to 5.66 (telephoto edge)

Angle of view (2ω)=87.4° (wide angle edge) to 33.12° (intermediate zoom position) to 10.56° (telephoto edge)

(Values Related to Conditional Expression (1))

At wide angle edge, interval between lens farthest on imaging plane side among lenses of the second lens group $G_{22}$ and lens farthest on object side among lenses of the third lens group $G_{23}$ (D23W)=11.363

D23W/FW=2.60

(Values Related to Conditional Expression (2))

Focal length of the first lens group $G_{21}$ (F1)=35.3573

Focal length of the second lens group $G_{22}$ (F2)=−5.7182

|F1/F2|=6.18

(Values Related to Conditional Expression (3))

Total length of optical system, at wide angle edge (TaW)=38.7179

Total length of optical system, at telephoto edge (TaT)=55.4904

Half angle of view of optical system, at wide angle edge (ωW)=43.70

Maximum paraxial image height at wide angle edge (Ymax)=4.1839

(TaW+TaT)/(tan(ωW)×Ymax)=23.56

$r_1=35.3665$ $d_1=0.7000$ $nd_2=1.92286$ $vd_2=20.88$ $r_2=22.7365$ $d_2=2.8303$ $nd_2=1.61800$ $vd_2=63.39$ $r_3=94.1318$ $d_3=0.1500$ $r_4=22.1345$ $d_4=2.1521$ $nd_3=1.78800$ $vd_3=47.49$ $r_5=57.3854$ $d_5=0.5000$ (wide angle edge) to 8.0817 (intermediate zoom position) to 19.4548 (telephoto edge)

$r_6=19.8247$ (aspheric surface)

$d_6=0.8000$ $nd_4=1.85639$ $vd_4=40.10$ $r_7=4.0732$ (aspheric surface)

$d_7=2.6721$ $r_8=701.8212$ $d_8=0.4500$ $nd_5=1.77250$ $vd_5=49.62$ $r_9=8.1000$ $d_9=1.6506$ $nd_6=2.01390$ $vd_6=19.32$ $r_{10}=27.7772$ (aspheric surface)

$d_{10}=11.0131$ (wide angle edge) to 3.0593 (intermediate zoom position) to 0.1500 (telephoto edge)

$r_{11}=\infty$ (diaphragm)

$d_{11}=0.3500$ $r_{12}=4.6428$ (aspheric surface)

$d_{12}=1.3959$ $nd_7=1.80610$ $vd_7=40.74$ $r_{13}=9.1218$ $d_{13}=1.2040$ $nd_8=1.94595$ $vd_8=17.98$ $r_{14}=4.3311$ $d_{14}=0.3125$ $r_{15}=9.9065$ $d_{15}=1.2138$ $nd_9=1.61800$ $vd_9=63.39$ $r_{16}=-9.9065$ $d_{16}=4.2017$ (wide angle edge) to 7.1778 (intermediate zoom position) to 13.6497 (telephoto edge)

Figure 4:
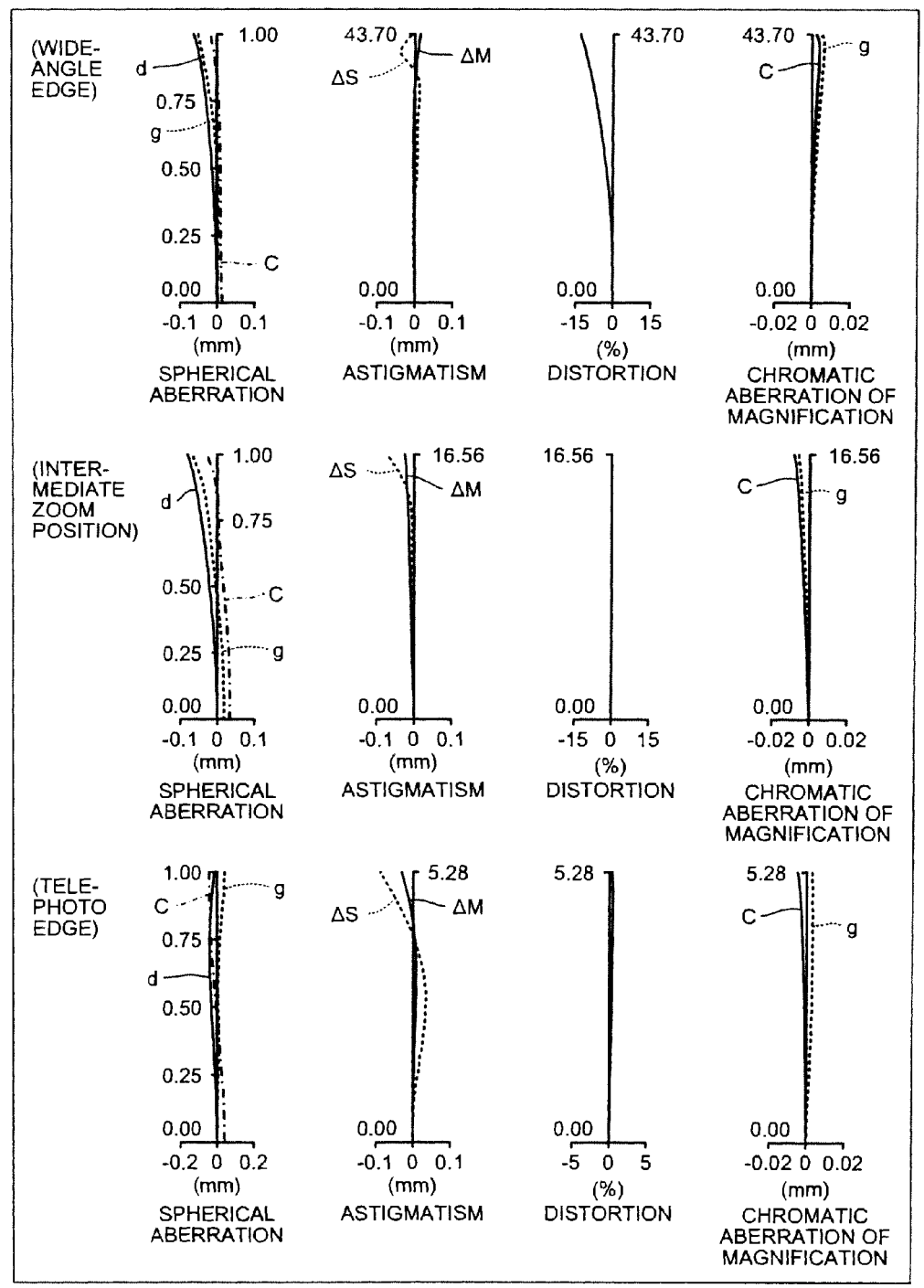
FIG. 4 is a diagram of various types of aberration of the zoom lens according to the second example.

$r_{17}$=16.9814 (aspheric surface)
  $d_{17}$=1.5000 $nd_{10}$=1.55516 $vd_{10}$=71.67
$r_{18}$=−224.2761 (aspheric surface)
  $d_{18}$=4.1129 (wide angle edge) to 7.3262 (intermediate zoom position) to 3.4643 (telephoto edge)
$r_{19}$=∞
  $d_{19}$=0.5000 $nd_{11}$=1.51680 $vd_{11}$=64.20
$r_{20}$=∞
  $d_{26}$=1.0090 (wide angle edge) to 0.9591 (intermediate zoom position) to 0.8904 (telephoto edge)
$r_{21}$=∞ (image plane)
Constant of cone (k) and Aspheric coefficients (A, B, C, D)
(Sixth Plane)
K=0,
A=1.09571×10$^{-4}$, B=−2.97768×10$^{-5}$,
C=6.21695×10$^{-7}$, D=−3.72502×10$^{-9}$
(Seventh Plane)
K=−0.1858,
A=7.30061×10$^{-4}$, B=3.77662×10$^{-6}$,
C=−3.03192×10$^{-6}$, D=−1.86011×10$^{-7}$
(Tenth Plane)
K=0,
A=−6.01399×10$^{-4}$, B=3.30880×10$^{-6}$,
C=1.07 326×10$^{-7}$, D=−4.56889×10$^{-10}$
(Twelfth Plane)
K=−0.5322,
A=2.34771×10$^{-5}$, B=1.08796×10$^{-5}$,
C=−1.60048×10$^{-6}$, D=5.07288×10$^{-7}$
(Seventeenth Plane)
K=−4.3209,
A=−6.78620×10$^{-4}$, B=3.28433×10$^{-5}$,
C=−1.41788×10$^{-6}$, D=−9.87708×10$^{-9}$
(Eighteenth Plane)
K=0,
A=−8.87070×10$^{-4}$, B=3.42 669×10$^{-5}$,
C=−1.76375×10$^{-6}$, D=3.39007×10$^{-9}$ FIG. 4 is a diagram of various types of aberration of the zoom lens according to the second example. In the diagram "g", "d", and "c" respectively represent aberrations for wavelengths corresponding to g-line (λ=435.83 nm), d-line (λ=587.56 nm), and c-line (λ=656.27 nm). In a portion of FIG. 4 indicating astigmatism, ΔS and ΔM represent aberration with respect to a sagittal image plane and a meridional image plane, respectively.

Figure 5:
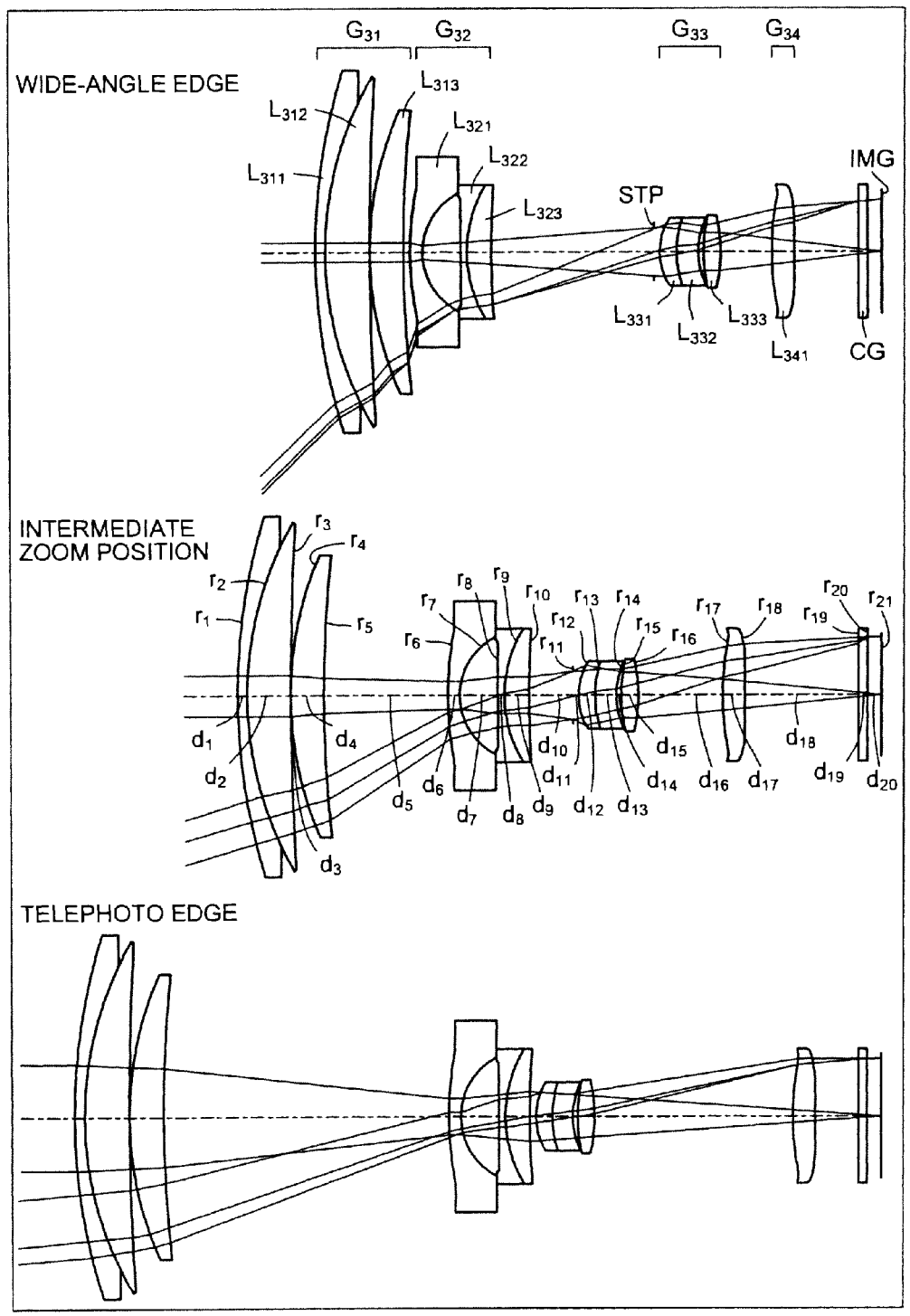
FIG. 5 is a cross sectional view (along the optical axis) of a zoom lens according to a third example.

FIG. 5 is a cross sectional view (along the optical axis) of a zoom lens according to a third example. The zoom lens includes, sequentially from the non-depicted object side, a positive first lens group $G_{31}$, a negative second lens group $G_{32}$, a positive third lens group $G_{33}$, and a positive fourth lens group $G_{34}$. Further, a diaphragm STP is disposed between the second lens group $G_{32}$ and the third lens group $G_{33}$. A cover glass CG (or filter) is disposed between the fourth lens group $G_{34}$ and the imaging plane IMG. The cover glass CG (or filter) is disposed as needed and may be omitted when not necessary. Further, at the imaging plane IMG, the optical receiving surface of an imaging element such as a CCD, a CMOS, etc. is disposed.

The first lens group $G_{31}$ includes sequentially from the object side, a negative lens $L_{311}$, a positive lens $L_{312}$, and a positive lens $L_{313}$. The negative lens $L_{311}$ and the positive lens $L_{312}$ are cemented together.

The second lens group $G_{32}$ includes sequentially from the object side, a negative lens $L_{321}$, a negative lens $L_{322}$, and a positive lens $L_{323}$. Both surfaces of the negative lens $L_{322}$ and a surface on the imaging plane IMG side of the positive lens $L_{323}$ are aspheric. Further, the negative lens $L_{322}$ and the positive lens $L_{323}$ are cemented together.

The third lens group $G_{33}$ includes sequentially from the object side, a positive lens $L_{331}$, a negative lens $L_{332}$, and a positive lens $L_{333}$. A surface on the object side of the positive lens $L_{331}$ is aspheric. Further, the positive lens $L_{331}$ and the negative lens $L_{332}$ are cemented together.

The fourth lens group $G_{34}$ includes a positive lens $L_{341}$. Both surfaces of the positive lens $L_{341}$ are aspheric.

The zoom lens zooms from the wide angle edge to the telephoto edge by moving the first lens group $G_{31}$, the second lens group $G_{32}$, and the third lens group $G_{33}$ along the optical axis. Furthermore, the zoom lens corrects imaging plane (image location) variation accompanying zoom and focuses the image, by moving the fourth lens group $G_{34}$ along the optical axis.

Various values related to the zoom lens according to the third example are indicated below.

Focal length of zoom lens system=4.381 (wide angle edge) to 13.307 (intermediate zoom position) to 41.113 (telephoto edge)
F number=3.60 (wide angle edge) to 4.82 (intermediate zoom position) to 5.71 (telephoto edge)
Angle of view (2ω)=87.4° (wide angle edge) to 33.12° (intermediate zoom position) to 10.56° (telephoto edge)
(Values Related to Conditional Expression (1))
At wide angle edge, interval between lens farthest on imaging plane side among lenses of the second lens group $G_{32}$ and lens farthest on object side among lenses of the third lens group $G_{33}$ (D23W)=10.771
D23W/FW=2.50
(Values Related to Conditional Expression (2))
Focal length of the first lens group $G_{31}$ (F1)=35.4149
Focal length of the second lens group $G_{32}$ (F2)=−5.6003
|F1/F2|=6.32
(Values Related to Conditional Expression (3))
Total length of optical system, at wide angle edge (TaW)=38.1391
Total length of optical system, at telephoto edge (TaT)=55.6475
Half angle of view of optical system, at wide angle edge (ωW)=43.70
Maximum paraxial image height at the wide angle edge (Ymax)=4.1861
(TaW+TaT)/(tan(ωW)×Ymax)=23.45
$r_1$=33.2686
  $d_1$=0.8000 $nd_1$=1.84666 $vd_1$=23.78
$r_2$=19.8000
  $d_2$=3.0214 $nd_2$=1.61800 $vd_2$=63.39
$r_3$=80.0497
  $d_3$=0.1500
$r_4$=24.5713
  $d_4$=2.2786 $nd_3$=1.78800 $vd_3$=47.49
$r_5$=78.2687
  $d_5$=0.5000 (wide angle edge) to 9.5000 (intermediate zoom position) to 19.6766 (telephoto edge)
$r_6$=25.2886 (aspheric surface)
  $d_6$=0.8000 $nd_4$=1.85135 $vd_4$=40.10
$r_7$=4.1057 (aspheric surface)
  $d_7$=2.4507
$r_8$=562.3556
  $d_8$=0.4500 $nd_5$=1.77250 $vd_5$=49.62
$r_9$=8.5000
  $d_9$=1.5324 $nd_6$=2.00170 $vd_6$=19.32
$r_{10}$=31.7164 (aspheric surface)
  $d_{10}$=10.4212 (wide angle edge) to 3.2143 (intermediate zoom position) to 0.1500 (telephoto edge)
$r_{11}$=∞ (diaphragm)
  $d_{11}$=0.3500

$r_{12}$=4.6699 (aspheric surface)
  $d_{12}$=1.1969 $nd_7$=1.80610 $vd_7$=40.74
$r_{13}$=9.2400
  $d_{13}$=1.3621 $nd_8$=1.94595 $vd_8$=17.98
$r_{14}$=4.4271
  $d_{14}$=0.3144
$r_{15}$=10.8758
  $d_{15}$=1.2266 $nd_9$=1.61800 $vd_9$=63.39
$r_{16}$=−9.1157
  $d_{16}$=4.0000 (wide angle edge) to 7.1658 (intermediate zoom position) to 13.6403 (telephoto edge)
$r_{17}$=17.2904 (aspheric surface)
  $d_{17}$=1.5000 $nd_{10}$=1.59201 $vd_{10}$=67.02
$r_{18}$=−500.0000 (aspheric surface)
  $d_{18}$=3.6718 (wide angle edge) to 6.6915 (intermediate zoom position) to 3.2000 (telephoto edge)
$r_{19}$=∞
  $d_{19}$=0.5000 $nd_{11}$=1.51680 $vd_{11}$=64.20
$r_{20}$=∞
  $d_{20}$=1.6130 (wide angle edge) to 1.0391 (intermediate zoom position) to 1.0475 (telephoto edge)
$r_{21}$=∞ (image plane)
Constant of cone (k), and Aspheric coefficients (A, B, C, D)
(Sixth Plane)
K=0,
A=1.70699×10⁻⁴, B=−3.32288×10⁻⁵,
C=7.95002×10⁻⁷, D=−6.27099×10⁻⁹
(Seventh Plane)
K=−0.1858,
A=8.43675×10⁻⁴, B=6.56293×10⁻⁶,
C=−2.00670×10⁻⁶, D=−2.29541×10⁻⁷
(Tenth Plane)
K=0,
A=−5.64411×10⁻⁴, B=−1.75974×10⁻⁵,
C=1.70798×10⁻⁶, D=−3.89949×10⁻⁸
(Twelfth Plane)
K=−0.5973,
A=−1.92725×10⁻⁵, B=8.22671×10⁻⁵,
C=−2.28281×10⁻⁵, D=2.78115×10⁻⁶
(Seventeenth Plane)
K=1.6141,
A=−5.92164×10⁻⁴, B=1.68205×10⁻⁵,
C=−7.73392×10⁻⁷, D=−2.40077×10⁻⁸
(Eighteenth Plane)
K=0,
A=−6.47064×10⁻⁴, B=2.16671×10⁻⁵,
C=−1.42681×10⁻⁶, D=−6.03161×10⁻¹⁰

Figure 6:
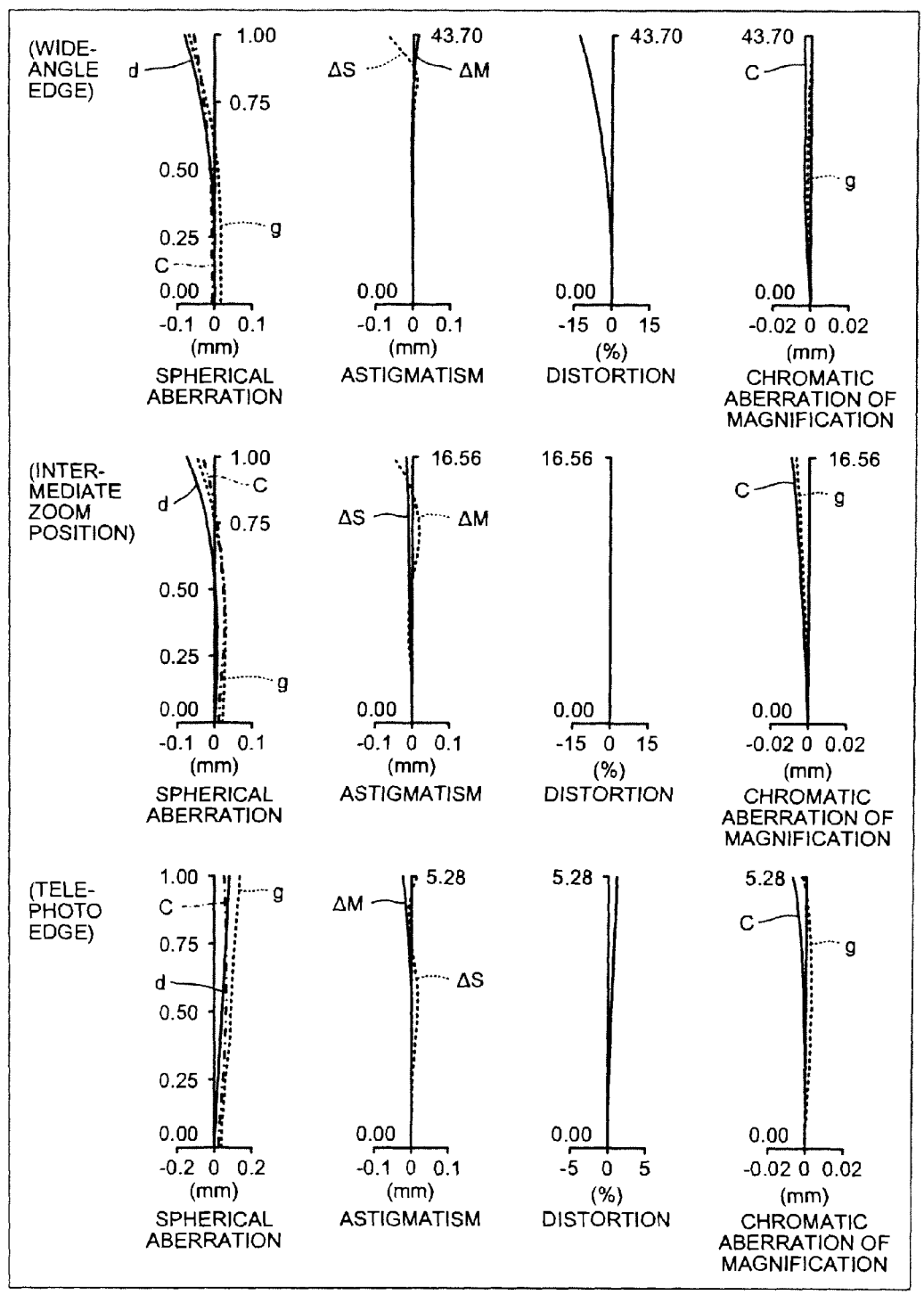
FIG. 6 is a diagram of various types of aberration of the zoom lens according to the third example.

FIG. 6 is a diagram of various types of aberration of the zoom lens according to the third example. In the diagram "g", "d", and "c" respectively represent aberrations for wavelengths corresponding to g-line (λ=435.83 nm), d-line (λ=587.56 nm), and c-line (λ=656.27 nm). In a portion of FIG. 6 indicating astigmatism, ΔS and ΔM represent aberration with respect to a sagittal image plane and a meridional image plane, respectively.

Among the values for the examples above, $r_1$, $r_2$, . . . indicate radii of curvature for each lens, diaphragm surface, etc.; $d_1$, $d_2$, . . . indicate the thickness of the lenses, diaphragm, etc. or the distance between surfaces thereof; $nd_1$, $nd_2$, . . . indicate the refraction index of each lens with respect to the d-line (λ=587.56 nm); $vd_1$, $vd_2$, . . . indicate the Abbe number with respect to the d-line (λ=587.56 nm) of each lens.

Each of the aspheric surfaces above can be expressed by the equation hereinafter, where Z=the depth of the aspheric surface, y=the height from the optical axis, and the direction of travel of light is positive.

$$Z = \frac{y^2}{R\left(1 + \sqrt{1 - (1+K)y/R^2}\right)^2} + Ay^4 + By^6 + Cy^8 + Dy^{10} \quad [1]$$

Where, R is paraxial radii of curvature; K is constant of the cone; and A, B, C, D are the fourth, sixth, eighth, and tenth aspheric coefficients, respectively.

As described above, the zoom lens according to each of the examples above has a small aperture, has a wide angle of view (80° or greater), is able to maintain high optical performance over the entire zoom range, and has a high zoom ratio (8 or greater), by satisfying the conditional expressions above.

Figure 7:
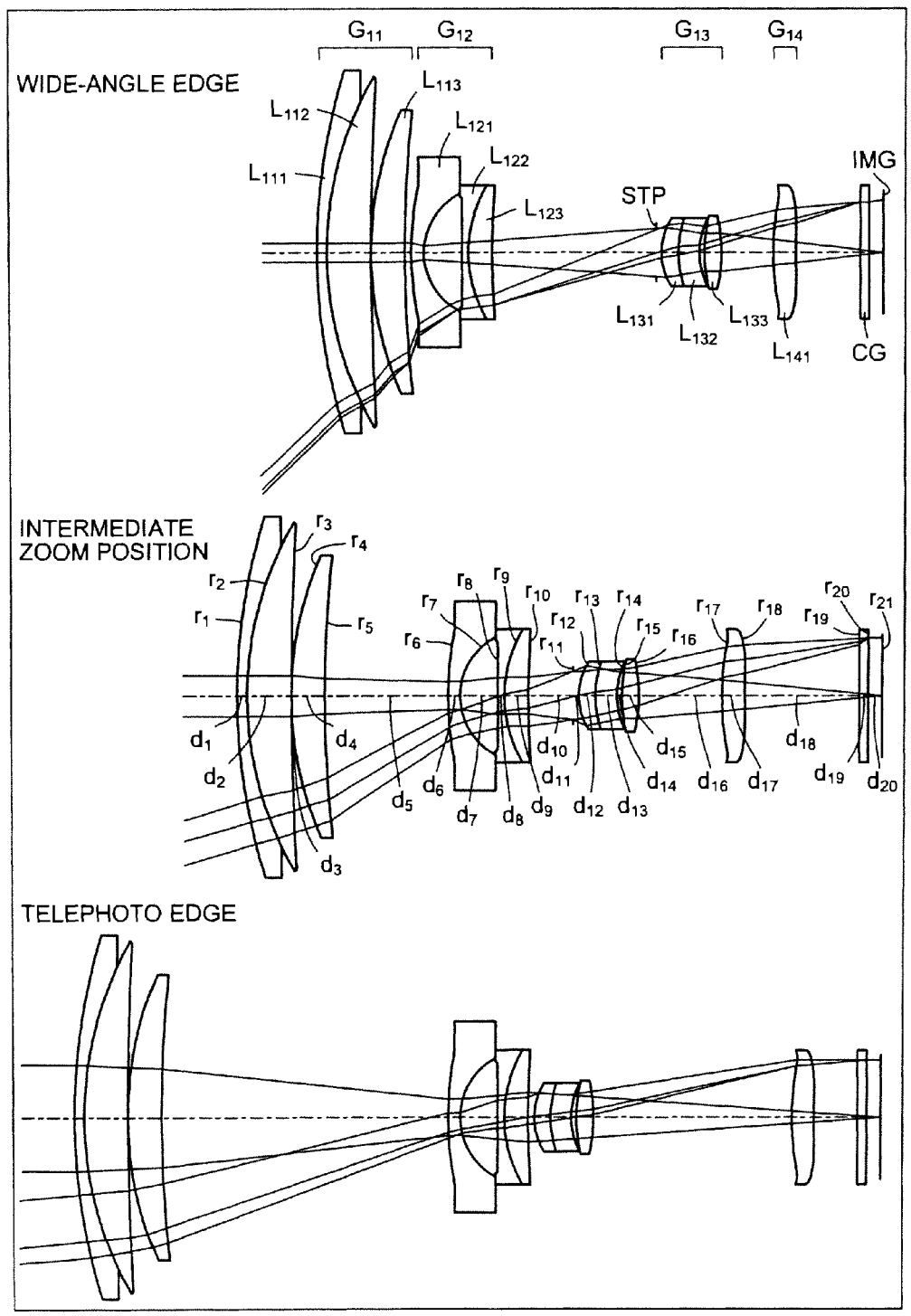
FIG. 7 is a cross sectional view (along the optical axis) of a zoom lens according to a fourth example.

FIG. 7 is a cross sectional view (along the optical axis) of a zoom lens according to a fourth example. The zoom lens includes, sequentially from the non-depicted object side, a positive first lens group $G_{11}$, a negative second lens group $G_{12}$, a positive third lens group $G_{13}$, and a positive fourth lens group $G_{14}$. Further, a diaphragm STP is disposed between the second lens group $G_{12}$ and the third lens group $G_{13}$. A cover glass CG (or filter) is disposed between the fourth lens group $G_{14}$ and the imaging plane IMG. The cover glass CG (or filter) is disposed as needed and may be omitted when not necessary. Further, at the imaging plane IMG, the optical receiving surface of an imaging element such as a CCD, a CMOS, etc. is disposed.

The first lens group $G_{11}$ includes sequentially from the object side, a negative lens $L_{111}$, a positive lens $L_{112}$, and a positive lens $L_{113}$. The negative lens $L_{111}$ and the positive lens $L_{112}$ are cemented together.

The second lens group $G_{12}$ includes sequentially from the object side, a negative lens $L_{121}$, a negative lens $L_{122}$, and a positive lens $L_{123}$. Both surfaces of the negative lens $L_{121}$ and a surface on the imaging plane IMG side of the positive lens $L_{123}$ are aspheric. Further, the negative lens $L_{122}$ and the positive lens $L_{123}$ are cemented together.

The third lens group $G_{13}$ includes sequentially from the object side, a positive lens $L_{131}$, a negative lens $L_{132}$, and a positive lens $L_{133}$. A surface on the object side of the positive lens $L_{131}$ is aspheric. Further, the positive lens $L_{131}$ and the negative lens $L_{132}$ are cemented together.

The fourth lens group $G_{14}$ includes a positive lens $L_{114}$. Both surfaces of the positive lens $L_{141}$ are aspheric.

The zoom lens zooms from the wide angle edge to the telephoto edge by moving the first lens group $G_{11}$, the second lens group $G_{12}$, and the third lens group $G_{13}$ along the optical axis. Furthermore, the zoom lens corrects imaging plane (image location) variation accompanying zoom and focuses the image, by moving the fourth lens group $G_{14}$ along the optical axis.

Various values related to the zoom lens according to the fourth example are indicated below.

Focal length of zoom lens system=4.365 (wide angle edge) to 13.109 (intermediate zoom position) to 41.178 (telephoto edge)
F number=3.58 (wide angle edge) to 4.84 (intermediate zoom position) to 5.75 (telephoto edge)
Angle of view (2ω)=87.6° (wide angle edge) to 33.6° (intermediate zoom position) to 10.56° (telephoto edge)
(Values Related to Conditional Expression (4))
Total thickness along optical axis of lens groups (ΣD)=17.0882
Half angle of view of optical system, at wide angle edge (ωW)=43.80

Maximum paraxial image height at the wide angle edge (Ymax)=4.1858
ΣD/(tan(ωW)×Ymax)=4.26
(Values Related to Conditional Expression (5))
Focal length of the second lens group $G_{12}$ (F2)=−5.8942
Focal length of the third lens group $G_{13}$ (F3)=8.9547
Focal length (infinity focus) of the entire optical system at wide angle edge (FW)=4.3649
|F2×F3|/FW=12.09
(Values Related to Conditional Expression (6))
Focal length of the second lens group $G_{12}$ (F2)=−5.8942
Thickness along direction of optical axis of the second lens group $G_{12}$ (D2)=5.5275
Maximum paraxial image height at the wide angle edge (Ymax)=4.1858
|F2×D2|/Ymax=7.78
$r_1$=42.4567
  $d_1$=0.7000 $nd_1$=1.92286 $vd_1$=20.88
$r_2$=23.7410
  $d_2$=2.8893 $nd_2$=1.61800 $vd_2$=63.39
$r_3$=123.2525
  $d_3$=0.1500
$r_4$=24.3075
  $d_4$=2.2214 $nd_3$=1.88300 $vd_3$=40.80
$r_5$=72.0512
  $d_5$=0.5000 (wide angle edge) to 8.4947 (intermediate zoom position) to 19.7731 (telephoto edge)
$r_6$=18.2902 (aspheric surface)
  $d_6$=0.8000 $nd_4$=1.85135 $vd_4$=40.10
$r_7$=4.1413 (aspheric surface)
  $d_7$=2.6217
$r_8$=−104.4554
  $d_8$=0.4500 $nd_5$=1.74330 $vd_5$=49.22
$r_9$=8.5587
  $d_9$=1.6559 $nd_6$=2.00170 $vd_6$=19.32
$r_{10}$=31.8881 (aspheric surface)
  $d_{10}$=11.1821 (wide angle edge) to 3.0587 (intermediate zoom position) to 0.1871 (telephoto edge)
$r_{11}$=∞ (diaphragm)
  $d_{11}$=0.3500
$r_{12}$=4.4041 (aspheric surface)
  $d_{12}$=1.1356 $nd_7$=1.80611 $vd_7$=40.73
$r_{13}$=8.7508
  $d_{13}$=1.4251 $nd_8$=1.94595 $vd_8$=17.98
$r_{14}$=4.0934
  $d_{14}$=0.3433
$r_{15}$=10.1848
  $d_{15}$=1.1959 $nd_9$=1.61800 $vd_9$=63.39
$r_{16}$=−10.1848
  $d_{16}$=3.5000 (wide angle edge) to 5.7939 (intermediate zoom position) to 13.5388 (telephoto edge)
$r_{17}$=15.7815 (aspheric surface)
  $d_{17}$=1.5000 $nd_{10}$=1.55332 $vd_{10}$=71.67
$r_{18}$=−1000.0000 (aspheric surface)
  $d_{18}$=4.4707 (wide angle edge) to 7.8402 (intermediate zoom position) to 3.0627 (telephoto edge)
$r_{19}$=∞
  $d_{19}$=0.5000 $nd_{11}$=1.51680 $vd_{11}$=64.20
$r_{20}$=∞
  $d_{20}$=1.0081 (wide angle edge) to 1.0126 (intermediate zoom position) to 1.0311 (telephoto edge)
$r_{21}$=∞ (image plane)
Constant of cone (k) and Aspheric coefficients (A, B, C, D)
(Sixth Plane)
K=0,
A=1.16028×10⁻⁴, B=−4.00446×10⁻⁵,
C=9.99964×10⁻⁷, D=−7.76320×10⁻⁹

(Seventh Plane)
K=−0.1858,
A=6.53494×10⁻⁴, B=2.25949×10⁻⁵,
C=−7.88249×10⁻⁶, D=7.04313×10⁻⁵
(Tenth Plane)
K=0,
A=−5.92227×10⁻⁴, B=4.38745×10⁻⁶,
C=1.94199×10⁻⁷, D=−1.48702×10⁻⁵
(Twelfth Plane)
K=−0.5353,
A=9.52249×10⁻⁶, B=4.17341×10⁻⁵,
C=−8.84871×10⁻⁶, D=1.17972×10⁻⁶
(Seventeenth Plane)
K=−1.6970,
A=−6.34973×10⁻⁴, B=3.53883×10⁻⁵,
C=−2.81373×10⁻⁶, D=3.86441×10⁻⁶
(Eighteenth Plane)
K=0,
A=−6.44317×10⁻⁴, B=1.51939×10⁻⁵,
C=−1.68208×10⁻⁶, D=1.60171×10⁻⁵

Figure 8:
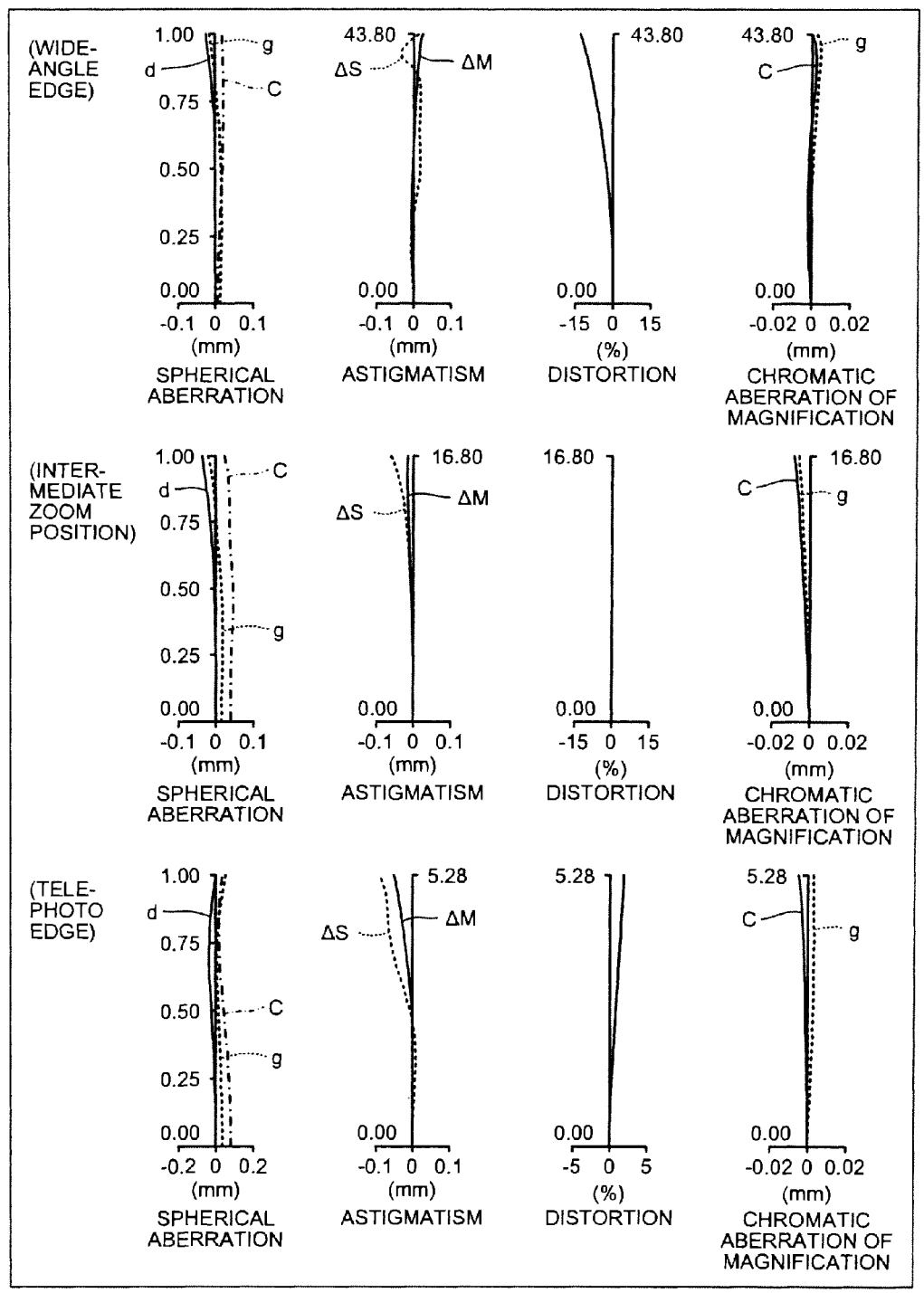
FIG. 8 is a diagram of various types of aberration of the zoom lens according to the fourth example.

FIG. 8 is a diagram of various types of aberration of the zoom lens according to the fourth example. In the diagram "g", "d", and "c" respectively represent aberrations for wavelengths corresponding to g-line (λ=435.83 nm), d-line (λ=587.56 nm), and c-line (λ=656.27 nm). In a portion of FIG. 8 indicating astigmatism, ΔS and ΔM represent aberration with respect to a sagittal image plane and a meridional image plane, respectively.

Figure 9:
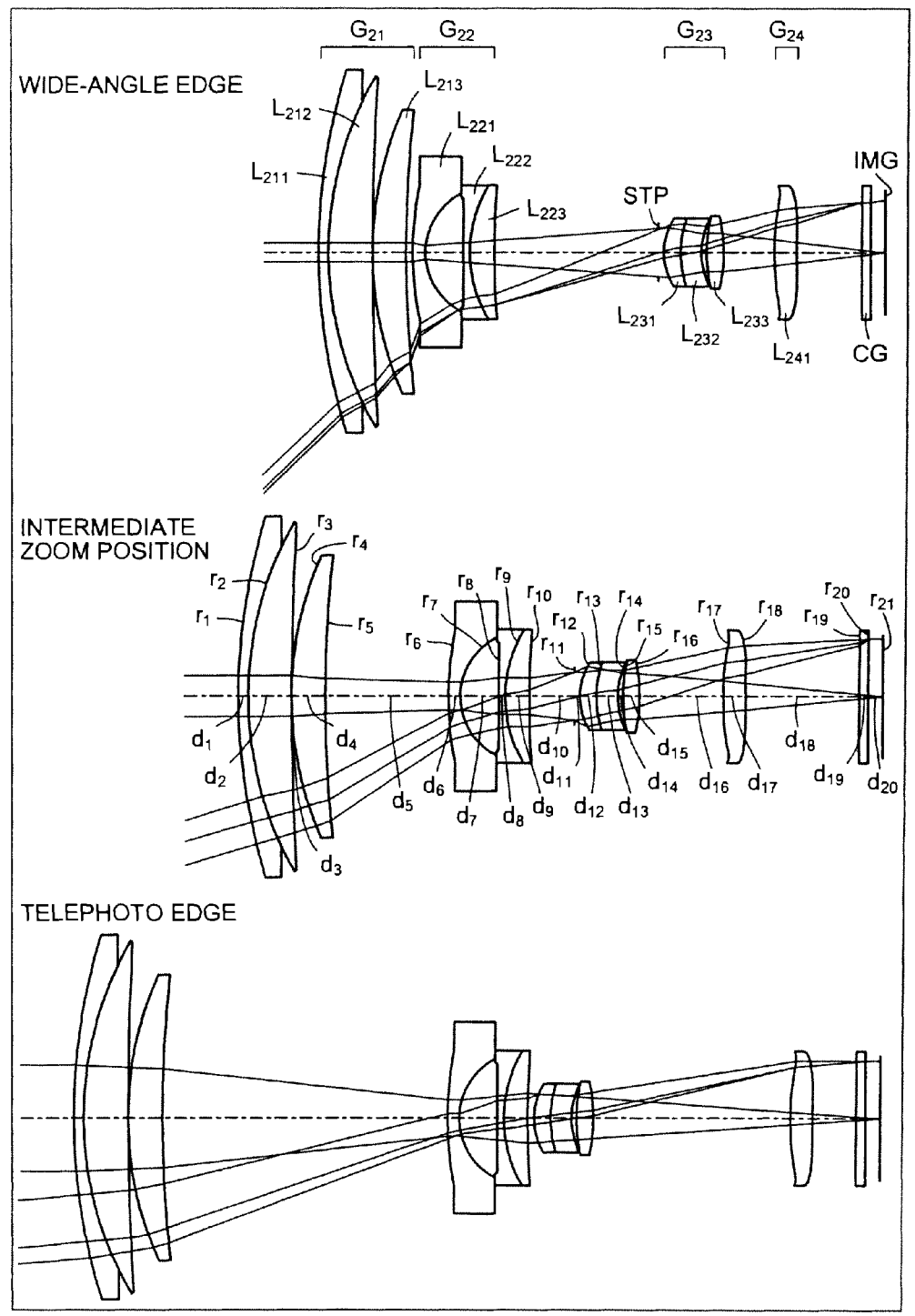
FIG. 9 is a cross sectional view (along the optical axis) of a zoom lens according to a fifth example.

FIG. 9 is a cross sectional view (along the optical axis) of a zoom lens according to a fifth example. The zoom lens includes, sequentially from the non-depicted object side, a positive first lens group $G_{21}$, a negative second lens group $G_{22}$, a positive third lens group $G_{23}$, and a positive fourth lens group $G_{24}$. Further, a diaphragm STP is disposed between the second lens group $G_{22}$ and the third lens group $G_{23}$. A cover glass CG (or filter) is disposed between the fourth lens group $G_{24}$ and the imaging plane IMG. The cover glass CG (or filter) is disposed as needed and may be omitted when not necessary. Further, at the imaging plane IMG, the optical receiving surface of an imaging element such as a CCD, a CMOS, etc. is disposed.

The first lens group $G_{21}$ includes sequentially from the object side, a negative lens $L_{211}$, a positive lens $L_{212}$, and a positive lens $L_{213}$. The negative lens $L_{211}$ and the positive lens $L_{212}$ are cemented together.

The second lens group $G_{22}$ includes sequentially from the object side, a negative lens $L_{221}$, a negative lens $L_{222}$, and a positive lens $L_{223}$. Both surfaces of the negative lens $L_{221}$ and a surface on the imaging plane IMG side of the positive lens $L_{223}$ are aspheric. Further, the negative lens $L_{222}$ and the positive lens $L_{223}$ are cemented together.

The third lens group $G_{23}$ includes sequentially from the object side, a positive lens $L_{231}$, a negative lens $L_{232}$, and a positive lens $L_{233}$. A surface on the object side of the positive lens $L_{231}$ is aspheric. Further, the positive lens $L_{231}$ and the negative lens $L_{232}$ are cemented together.

The fourth lens group $G_{24}$ includes a positive lens $L_{241}$. Both surfaces of the positive lens $L_{241}$ are aspheric.

The zoom lens zooms from the wide angle edge to the telephoto edge by moving the first lens group $G_{21}$, the second lens group $G_{22}$, and the third lens group $G_{23}$ along the optical axis. Furthermore, the zoom lens corrects imaging plane (image location) variation accompanying zoom and focuses the image, by moving the fourth lens group $G_{24}$ along the optical axis.

Various values related to the zoom lens according to the fifth example are indicated below.

Focal length of zoom lens system=4.378 (wide angle edge) to 13.059 (intermediate zoom position) to 40.991 (telephoto edge)

F number=3.58 (wide angle edge) to 4.88 (intermediate zoom position) to 5.66 (telephoto edge)

Angle of view (2ω)=87.4° (wide angle edge) to 33.12° (intermediate zoom position) to 10.56° (telephoto edge)

(Values Related to Conditional Expression (4))

Total thickness along optical axis of lens groups (ΣD)=17.0313

Half angle of view of optical system, at wide angle edge (ωW)=43.70

Maximum paraxial image height at the wide angle edge (Ymax)=4.1839

ΣD/(tan(ωW)×Ymax)=4.26

(Values Related to Conditional Expression (5))

Focal length of the second lens group $G_{22}$ (F2)=−5.7182

Focal length of the third lens group $G_{23}$ (F3)=8.8889

Focal length (infinity focus) of the entire optical system at wide angle edge (FW)=4.3782

|F2×F3|/FW=11.61

(Values Related to Conditional Expression (6))

Focal length of the second lens group $G_{22}$ (F2)=−5.7182

Thickness along direction of optical axis of the second lens group $G_{22}$ (D2)=5.5727

Maximum paraxial image height at the wide angle edge (Ymax)=4.1839

|F2×D2|/Ymax=7.62

$r_1$=35.3665
$\quad d_1$=0.7000 $nd_1$=1.92286 $vd_1$=20.88
$r_2$=22.7365
$\quad d_2$=2.8303 $nd_2$=1.61800 $vd_2$=63.39
$r_3$=94.1318
$\quad d_3$=0.1500
$r_4$=22.1345
$\quad d_4$=2.1521 $nd_3$=1.78800 $vd_3$=47.49
$r_5$=57.3854
$\quad d_5$=0.5000 (wide angle edge) to 8.0817 (intermediate zoom position) to 19.4548 (telephoto edge)
$r_6$=19.8247 (aspheric surface)
$\quad d_6$=0.8000 $nd_4$=1.85639 $vd_4$=40.10
$r_7$=4.0732 (aspheric surface)
$\quad d_7$=2.6721
$r_8$=701.8212
$\quad d_8$=0.4500 $nd_5$=1.77250 $vd_5$=49.62
$r_9$=8.1000
$\quad d_9$=1.6506 $nd_6$=2.01390 $vd_6$=19.32
$r_{10}$=27.7772 (aspheric surface)
$\quad d_{10}$=11.0131 (wide angle edge) to 3.0593 (intermediate zoom position) to 0.1500 (telephoto edge)
$r_{11}$=∞ (diaphragm)
$\quad d_{11}$=0.3500
$r_{12}$=4.6428 (aspheric surface)
$\quad d_{12}$=1.3959 $nd_7$=1.80610 $vd_7$=40.74
$r_{13}$=9.1218
$\quad d_{13}$=1.2040 $nd_8$=1.94595 $vd_8$=17.98
$r_{14}$=4.3311
$\quad d_{14}$=0.3125
$r_{15}$=9.9065
$\quad d_{15}$=1.2138 $nd_9$=1.61800 $vd_9$=63.39
$r_{16}$=−9.9065
$\quad d_{16}$=4.2017 (wide angle edge) to 7.1778 (intermediate zoom position) to 13.6497 (telephoto edge)
$r_{17}$=16.9814 (aspheric surface)
$\quad d_{17}$=1.5000 $nd_{10}$=1.55516 $vd_{10}$=71.67
$r_{18}$=−224.2761 (aspheric surface)
$\quad d_{18}$=4.1129 (wide angle edge) to 7.3262 (intermediate zoom position) to 3.4643 (telephoto edge)
$r_{19}$=∞
$\quad d_{19}$=0.5000 $nd_{11}$=1.51680 $vd_{11}$=64.20
$r_{20}$=∞
$\quad d_{20}$=1.0090 (wide angle edge) to 0.9591 (intermediate zoom position) to 0.8904 (telephoto edge)
$r_{21}$=∞ (image plane)

Constant of cone (k) and Aspheric coefficients (A, B, C, D)

Figure 10:
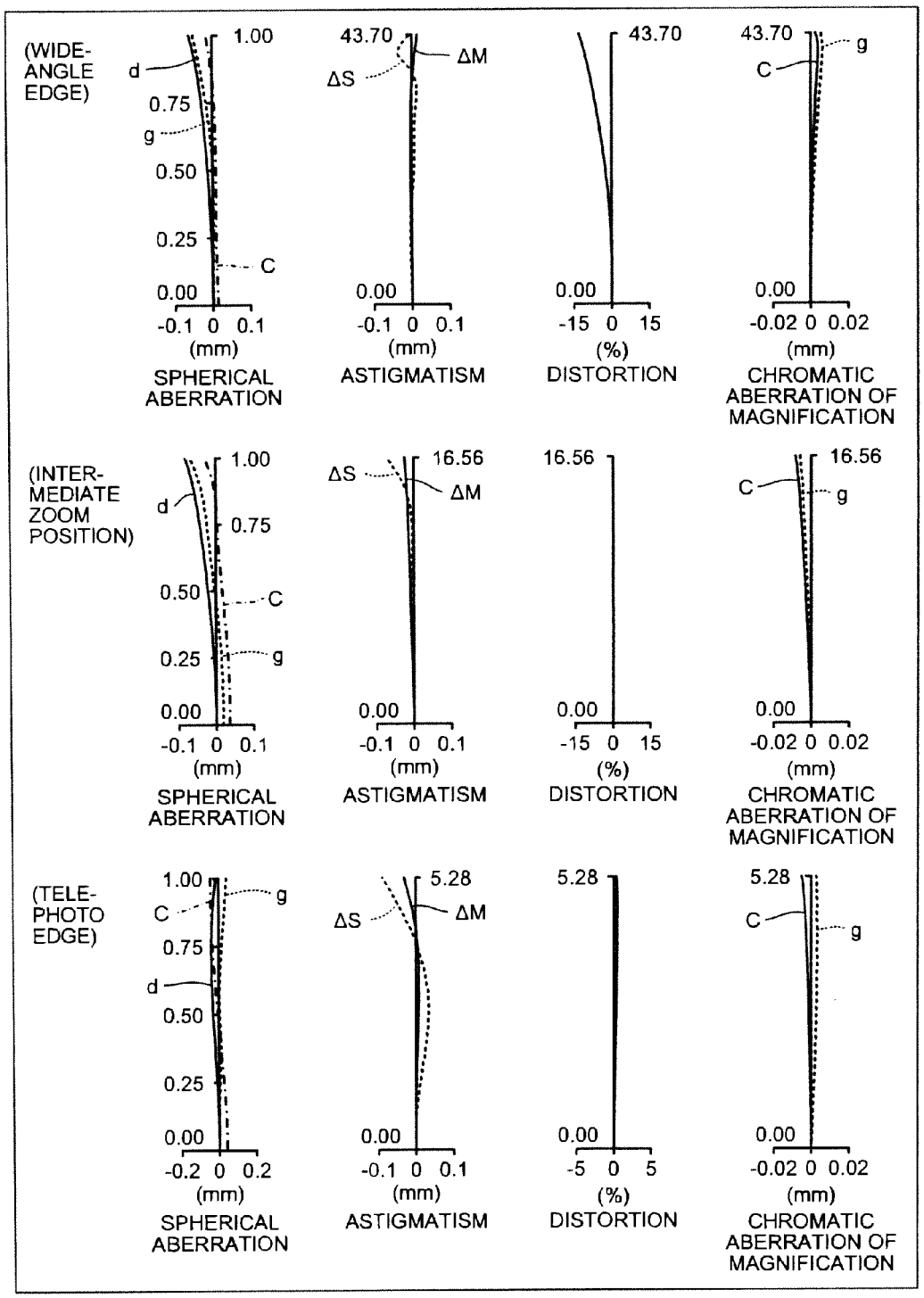
FIG. 10 is a diagram of various types of aberration of the zoom lens according to the fifth example.

(Sixth Plane)
K=0,
A=$1.09571 \times 10^{-4}$, B=$-2.97768 \times 10^{-5}$,
C=$6.21695 \times 10^{-7}$, D=$-3.72502 \times 10^{-9}$ (Seventh Plane)
K=−0.1858,
A=$7.30061 \times 10^{-4}$, B=$3.77662 \times 10^{-6}$,
C=$-3.03192 \times 10^{-6}$, D=$-1.86011 \times 10^{-7}$ (Tenth Plane)
K=0,
A=$-6.01399 \times 10^{-4}$, B=$3.30880 \times 10^{-6}$,
C=$1.07326 \times 10^{-7}$, D=$-4.56889 \times 10^{-10}$ (Twelfth Plane)
K=−0.5322,
A=$2.34771 \times 10^{-5}$, B=$1.08796 \times 10^{-5}$,
C=$-1.60048 \times 10^{-6}$, D=$5.07288 \times 10^{-7}$ (Seventeenth Plane)
K=−4.3209,
A=$-6.78620 \times 10^{-4}$, B=$3.28433 \times 10^{-5}$,
C=$-1.41788 \times 10^{-6}$, D=$-9.87708 \times 10^{-9}$ (Eighteenth Plane)
K=0,
A=$-8.87070 \times 10^{-4}$, B=$3.42669 \times 10^{-5}$,
C=$-1.76375 \times 10^{-6}$, D=$3.39007 \times 10^{-9}$ FIG. 10 is a diagram of various types of aberration of the zoom lens according to the fifth example. In the diagram "g", "d", and "c" respectively represent aberrations for wavelengths corresponding to g-line (λ=435.83 nm), d-line (λ=587.56 nm), and c-line (λ=656.27 nm). In a portion of FIG. 10 indicating astigmatism, ΔS and ΔM represent aberration with respect to a sagittal image plane and a meridional image plane, respectively.

Figure 11:
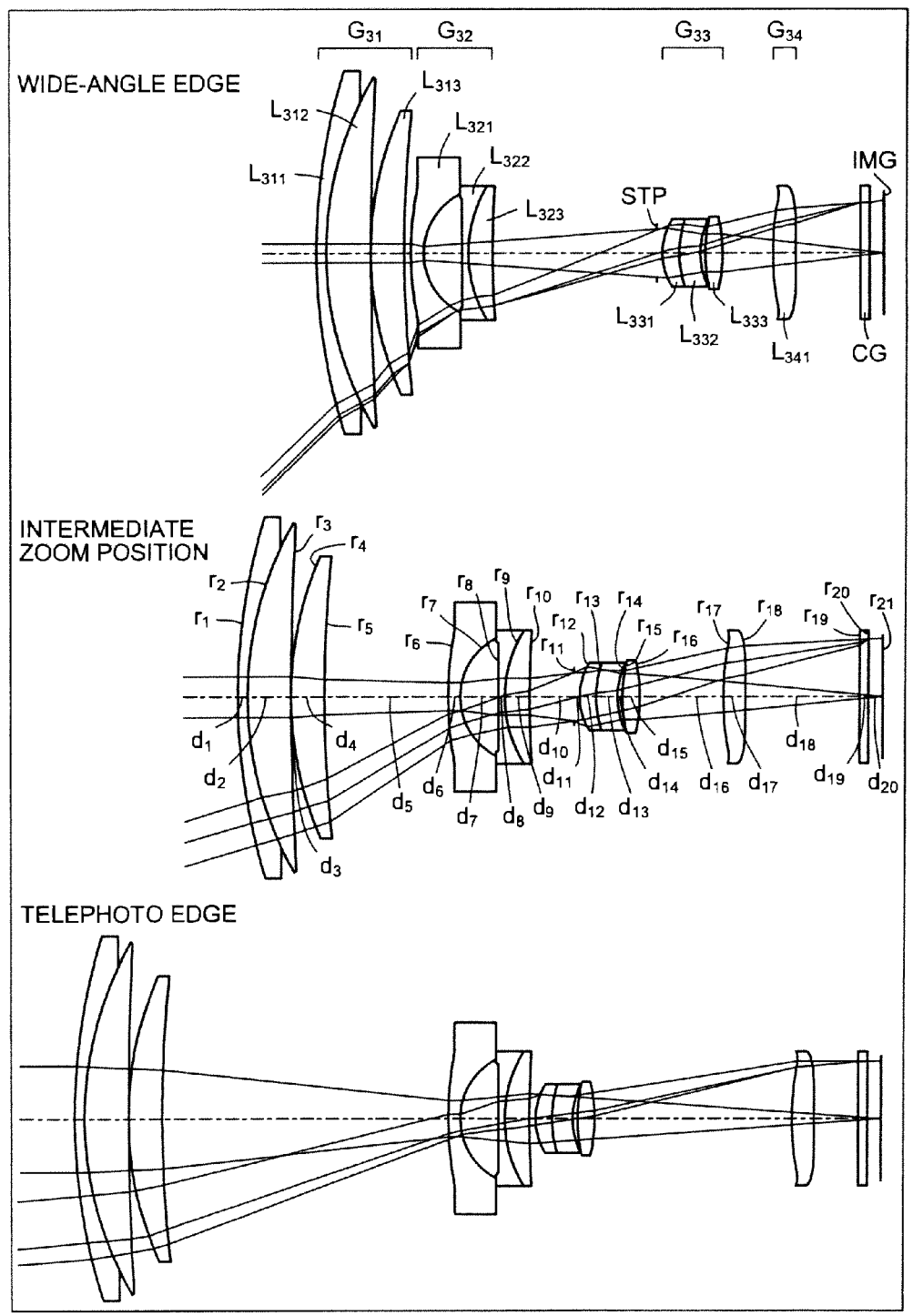
FIG. 11 is a cross sectional view (along the optical axis) of a zoom lens according to a sixth example.

FIG. 11 is a cross sectional view (along the optical axis) of a zoom lens according to a sixth example. The zoom lens includes, sequentially from the non-depicted object side, a positive first lens group $G_{31}$, a negative second lens group $G_{32}$, a positive third lens group $G_{33}$, and a positive fourth lens group $G_{34}$. Further, a diaphragm STP is disposed between the second lens group $G_{32}$ and the third lens group $G_{33}$. A cover glass CG (or filter) is disposed between the fourth lens group $G_{34}$ and the imaging plane IMG. The cover glass CG (or filter) is disposed as needed and may be omitted when not necessary. Further, at the imaging plane IMG, an optical receiving surface of an imaging element such as a CCD, a CMOS, etc. is disposed.

The first lens group $G_{31}$ includes sequentially from the object side, a negative lens $L_{311}$, a positive lens $L_{312}$, and a positive lens $L_{313}$. The negative lens $L_{311}$ and the positive lens $L_{312}$ are cemented together.

The second lens group $G_{32}$ includes sequentially from the object side, a negative lens $L_{321}$, a negative lens $L_{322}$, and a positive lens $L_{323}$. Both surfaces of the negative lens $L_{321}$ and a surface on the imaging plane IMG side of the positive lens $L_{323}$ are aspheric. Further, the negative lens $L_{322}$ and the positive lens $L_{323}$ are cemented together.

The third lens group $G_{33}$ includes sequentially from the object side, a positive lens $L_{331}$, a negative lens $L_{332}$, and a positive lens $L_{333}$. A surface on the object side of the positive lens $L_{331}$ is aspheric. Further, the positive lens $L_{331}$ and the negative lens $L_{332}$ are cemented together.

The fourth lens group $G_{34}$ includes a positive lens $L_{341}$. Both surfaces of the positive lens $L_{341}$ are aspheric.

The zoom lens zooms from the wide angle edge to the telephoto edge by moving the first lens group $G_{31}$, the second lens group $G_{32}$, and the third lens group $G_{33}$ along the optical axis. Furthermore, the zoom lens corrects imaging plane (image location) variation accompanying zoom and focuses the image, by moving the fourth lens group $G_{34}$ along the optical axis.

Various values related to the zoom lens according to the sixth example are indicated below.

Focal length of zoom lens system=4.381 (wide angle edge) to 13.307 (intermediate zoom position) to 41.113 (telephoto edge)

F number=3.60 (wide angle edge) to 4.82 (intermediate zoom position) to 5.71 (telephoto edge)

Angle of view (2ω)=87.4° (wide angle edge) to 33.12° (intermediate zoom position) to 10.56° (telephoto edge)

(Values Related to Conditional Expression (4))

Total thickness along optical axis of lens groups (ΣD)=17.0831

Half angle of view of optical system, at wide angle edge (ωW)=43.70

Maximum paraxial image height at the wide angle edge (Ymax)=4.1861

$\Sigma D/(\tan(\omega W) \times Ymax)=4.27$ (Values Related to Conditional Expression (5))

Focal length of the second lens group $G_{32}$ (F2)=−5.6003

Focal length of the third lens group $G_{33}$ (F3)=8.7461

Focal length (infinity focus) of entire optical system at wide angle edge (FW)=4.3805

|F2×F3|/FW=11.18

(Values Related to Conditional Expression (6))

Focal length of the second lens group $G_{32}$ (F2)=−5.6003

Thickness along direction of optical axis of the second lens group $G_{32}$ (D2)=5.2331

Maximum paraxial image height at the wide angle edge (Ymax)=4.1861

|F2×D2|/Ymax=7.00

$r_1$=33.2686
　$d_1$=0.8000 $nd_1$=1.84666 $vd_1$=23.78
$r_2$=19.8000
　$d_2$=3.0214 $nd_2$=1.61800 $vd_2$=63.39
$r_3$=80.0497
　$d_3$=0.1500
$r_4$=24.5713
　$d_4$=2.2786 $nd_3$=1.78800 $vd_3$=47.49
$r_5$=78.2687
　$d_5$=0.5000 (wide angle edge) to 9.5000 (intermediate zoom position) to 19.6766 (telephoto edge)
$r_6$=25.2886 (aspheric surface)
　$d_6$=0.8000 $nd_4$=1.85135 $vd_4$=40.10
$r_7$=4.1057 (aspheric surface)
　$d_7$=2.4507
$r_8$=562.3556
　$d_8$=0.4500 $nd_5$=1.77250 $vd_5$=49.62
$r_9$=8.5000
　$d_9$=1.5324 $nd_6$=2.00170 $vd_6$=19.32
$r_{10}$=31.7164 (aspheric surface)
　$d_{10}$=10.4212 (wide angle edge) to 3.2143 (intermediate zoom position) to 0.1500 (telephoto edge)
$r_{11}$=∞ (diaphragm)
　$d_{11}$=0.3500
$r_{12}$=4.6699 (aspheric surface)
　$d_{12}$=1.1969 $nd_7$=1.80610 $vd_7$=40.74

$r_{13}$=9.2400
　$d_{13}$=1.3621 $nd_8$=1.94595 $vd_8$=17.98
$r_{14}$=4.4271
　$d_{14}$=0.3144
$r_{15}$=10.8758
　$d_{15}$=1.2266 $nd_9$=1.61800 $vd_9$=63.39
$r_{16}$=−9.1157
　$d_{16}$=4.0000 (wide angle edge) to 7.1658 (intermediate zoom position) to 13.6403 (telephoto edge)
$r_{17}$=17.2904 (aspheric surface)
　$d_{17}$=1.5000 $nd_{10}$=1.59201 $vd_{10}$=67.02
$r_{18}$=−500.0000 (aspheric surface)
　$d_{18}$=3.6718 (wide angle edge) to 6.6915 (intermediate zoom position) to 3.2000 (telephoto edge)
$r_{19}$=∞
　$d_{19}$=0.5000 $nd_{11}$=1.51680 $vd_{11}$=64.20
$r_{20}$=∞
　$d_{20}$=1.6130 (wide angle edge) to 1.0391 (intermediate zoom position) to 1.0475 (telephoto edge)
$r_{21}$=∞ (image plane)

Constant of cone (k), and Aspheric coefficients (A, B, C, D)

Figure 12:
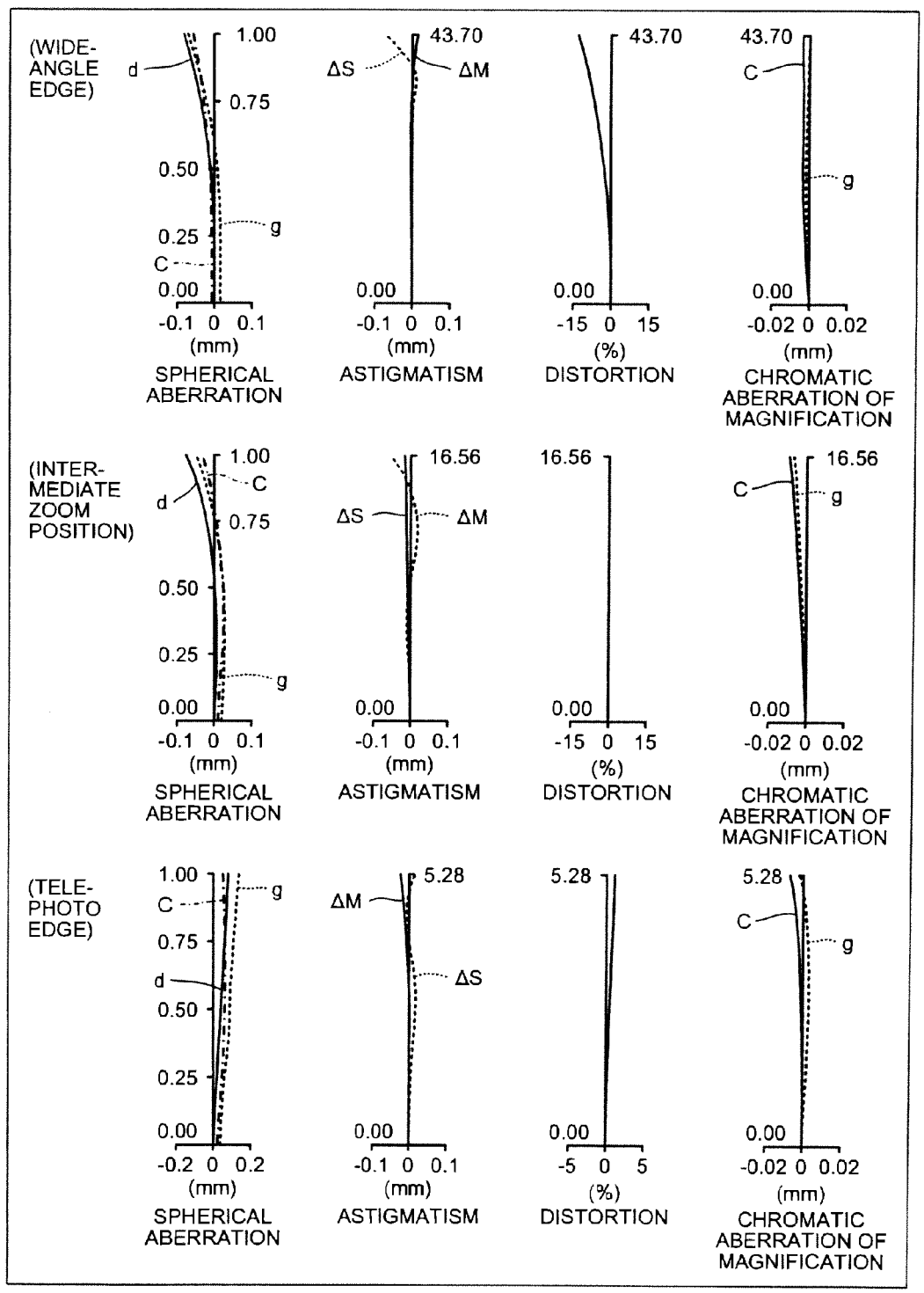
FIG. 12 is a diagram of various types of aberration of the zoom lens according to the sixth example.

(Sixth Plane)
K=0,
A=1.70699×10$^{-4}$, B=−3.32288×10$^{-5}$,
C=7.95002×10$^{-7}$, D=−6.27099×10$^{-9}$ (Seventh Plane)
K=−0.1858,
A=8.43675×10$^{-4}$, B=6.56293×10$^{-6}$,
C=−2.00670×10$^{-6}$, D=−2.29541×10$^{-7}$ (Tenth Plane)
K=0,
A=−5.64411×10$^{-4}$, B=−1.75974×10$^{-5}$,
C=1.70798×10$^{-6}$, D=−3.89949×10$^{-9}$ (Twelfth Plane)
K=−0.5973,
A=−1.92725×10$^{-5}$, B=8.22671×10$^{-5}$,
C=−2.28281×10$^{-5}$, D=2.78115×10$^{-6}$ (Seventeenth Plane)
K=1.6141,
A=−5.92164×10$^{-4}$, B=1.68205×10$^{-5}$,
C=−7.73392×10$^{-7}$, D=−2.40077×10$^{-8}$ (Eighteenth Plane)
K=0,
A=−6.47064×10$^{-4}$, B=2.16671×10$^{-5}$,
C=−1.42681×10$^{-6}$, D=−6.03161×10$^{-10}$ FIG. 12 is a diagram of various types of aberration of the zoom lens according to the sixth example. In the diagram "g", "d", and "c" respectively represent aberrations for wavelengths corresponding to g-line (λ=435.83 nm), d-line (λ=587.56 nm), and c-line (λ=656.27 nm). In a portion of FIG. 12 indicating astigmatism, ΔS and ΔM represent aberration with respect to a sagittal image plane and a meridional image plane, respectively.

Among the values for the examples above, $r_1$, $r_2$, . . . indicate radii of curvature for each lens, diaphragm surface, etc.; $d_1$, $d_2$, . . . indicate the thickness of the lenses, diaphragm, etc. or the distance between surfaces thereof; $nd_1$, $nd_2$, ... indicate the refraction index of each lens with respect to the d-line ($\lambda$=587.56 nm); $vd_1$, $vd_2$, ... indicate the Abbe number with respect to the d-line ($\lambda$=587.56 nm) of each lens.

Each of the aspheric surfaces above can be expressed by the equation hereinafter, where Z=the depth of the aspheric surface, y=the height from the optical axis, and the direction of travel of light is positive.

$$Z = \frac{y^2}{R\left(1 + \sqrt{1 - (1+K)y/R^2}\right)^2} + Ay^4 + By^6 + Cy^8 + Dy^{10} \quad [1]$$

Where, R is paraxial radii of curvature; K is constant of the cone; and A, B, C, D are the fourth, sixth, eighth, and tenth aspheric coefficients, respectively.

As described above, the zoom lens according to each of the examples above realizes a thinner retracted-state size and an increased angle of view (80° or greater) while having a high zoom ratio (8 or greater) by satisfying the conditional expressions above. Since a lens having a suitable aspheric surface is employed, satisfactory optical performance can be maintained with fewer lenses.

Figure 13:
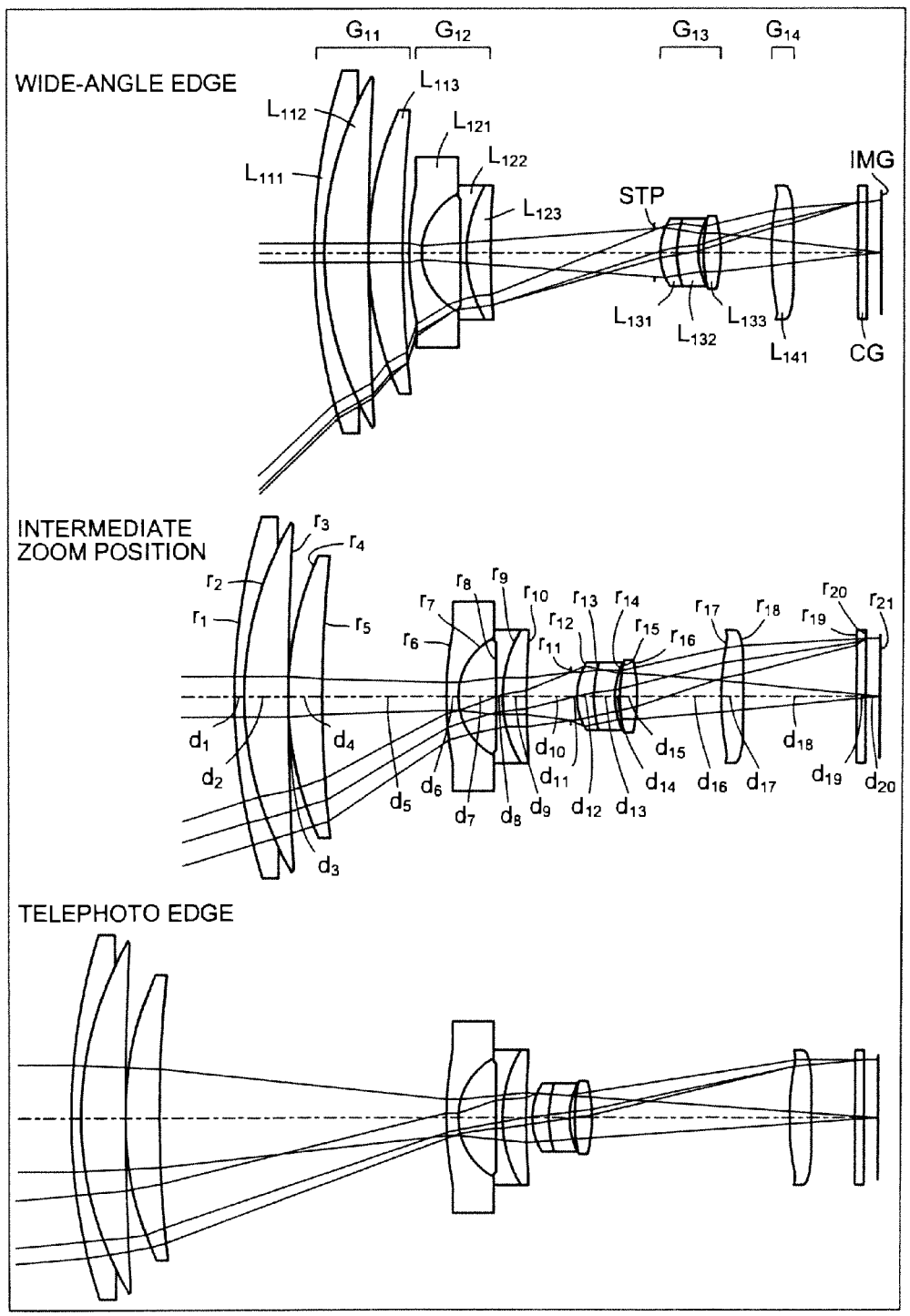
FIG. 13 is a cross sectional view (along the optical axis) of a zoom lens according to a seventh example.

FIG. 13 is a cross sectional view (along the optical axis) of a zoom lens according to a seventh example. The zoom lens includes, sequentially from the non-depicted object side, a positive first lens group $G_{11}$, a negative second lens group $G_{12}$, a positive third lens group $G_{13}$, and a positive fourth lens group $G_{14}$. Further, a diaphragm STP is disposed between the second lens group $G_{12}$ and the third lens group $G_{13}$. A cover glass CG (or filter) is disposed between the fourth lens group $G_{14}$ and the imaging plane IMG. The cover glass CG (or filter) is disposed as needed and may be omitted when not necessary. Further, at the imaging plane IMG, the optical receiving surface of an imaging element such as a CCD, a CMOS, etc. is disposed.

The first lens group $G_{11}$ includes sequentially from the object side, a negative lens $L_{111}$, a positive lens $L_{112}$, and a positive lens $L_{113}$. The negative lens $L_{111}$ and the positive lens $L_{112}$ are cemented together.

The second lens group $G_{12}$ includes sequentially from the object side, a negative lens $L_{121}$ (first negative lens), a negative lens $L_{122}$ (second negative lens), and a positive lens $L_{123}$. Both surfaces of the negative lens $L_{121}$ and a surface on the imaging plane IMG side of the positive lens $L_{123}$ are aspheric. Further, the negative lens $L_{122}$ and the positive lens $L_{123}$ are cemented together.

The third lens group $G_{13}$ includes sequentially from the object side, a positive lens $L_{131}$, a negative lens $L_{132}$, and a positive lens $L_{133}$. A surface on the object side of the positive lens $L_{131}$ is aspheric. Further, the positive lens $L_{131}$ and the negative lens $L_{132}$ are cemented together.

The fourth lens group $G_{14}$ includes a positive lens $L_{141}$. Both surfaces of the positive lens $L_{141}$ are aspheric.

The zoom lens zooms from the wide angle edge to the telephoto edge by moving the first lens group $G_{11}$, the second lens group $G_{12}$, and the third lens group $G_{13}$ along the optical axis. Furthermore, the zoom lens corrects imaging plane (image location) variation accompanying zoom and focuses the image, by moving the fourth lens group $G_{14}$ along the optical axis.

Various values related to the zoom lens according to the seventh example are indicated below.

Focal length of zoom lens system=4.365 (wide angle edge) to 13.109 (intermediate zoom position) to 41.178 (telephoto edge)

F number=3.58 (wide angle edge) to 4.82 (intermediate zoom position) to 5.75 (telephoto edge)

Angle of view (2$\omega$)=87.6° (wide angle edge) to 33.6° (intermediate zoom position) to 10.56° (telephoto edge)

(Values Related to Conditional Expression (7))

Average Abbe number with respect to d-line of positive lenses (positive lens $L_{112}$, positive lens $L_{113}$) of the first lens group $G_{11}$ ($\lambda$dP1)=52.0500

Average refractive index with respect to d-line of positive lens (positive lens $L_{112}$, positive lens $L_{113}$) of the first lens group $G_1$ (NdP1)=1.7505

$\lambda$dP1/NdP1=29.73

(Values Related to Conditional Expression (8))

Abbe number with respect to d-line of second negative lens (negative lens $L_{122}$) ($\lambda$dM2)=49.2000

Refractive index with respect to d-line of second negative lens (negative lens $L_{122}$) (NdM2)=1.7433

$\lambda$dM2/NdM2=28.22

(Values Related to Conditional Expression (9))

Abbe number with respect to d-line of positive lens (positive lens $L_{131}$) that among lenses of the third lens group $G_{13}$ is farthest on object side ($\lambda$dP3)=40.7000

Refractive index with respect to d-line of positive lens (positive lens $L_{131}$) that among lenses of the third lens group $G_{13}$ is farthest on object side (NdP3)=1.8061

($\lambda$dM2NdM2)−($\lambda$dP3/NdP3)=5.69

(Values Related to Conditional Expression (10))

Deviation of paraxial curvature radius at height that is 10% of the effective diameter of aspheric surface on the imaging plane IMG side of the positive lens $L_{123}$ in the second lens group $G_{12}$ and the aspheric shape (S10)=−0.1000

Height of 10% of effective diameter of the aspheric surface on the imaging plane IMG side of the positive lens $L_{123}$ in the second lens group $G_{12}$ (H10)=3.7

S10/H10=−0.0270

$r_1$=42.4567

$d_1$=0.7000 $nd_1$=1.92286 $vd_1$=20.88

$r_2$=23.7410

$d_2$=2.8893 $nd_2$=1.61800 $vd_2$=63.39

$r_3$=123.2525

$d_3$=0.1500

$r_4$=24.3075

$d_4$=2.2214 $nd_3$=1.88300 $vd_3$=40.80

$r_5$=72.0512

$d_5$=0.5000 (wide angle edge) to 8.4947 (intermediate zoom position) to 19.7731 (telephoto edge)

$r_6$=18.2902 (aspheric surface)

$d_6$=0.8000 $nd_4$=1.85135 $vd_4$=40.10

$r_7$=4.1413 (aspheric surface)

$d_7$=2.6217

$r_9$=−104.4554

$d_8$=0.4500 $nd_5$=1.74330 $vd_5$=49.22

$r_9$=8.5587

$d_9$=1.6559 $nd_6$=2.00170 $vd_6$=19.32

$r_{10}$=31.8881 (aspheric surface)

$d_{10}$=11.1821 (wide angle edge) to 3.0587 (intermediate zoom position) to 0.1871 (telephoto edge)

$r_{11}$=∞ (diaphragm)

$d_{11}$=0.3500

$r_{12}$=4.4041 (aspheric surface)

$d_{12}$=1.1356 $nd_7$=1.80611 $vd_7$=40.73

$r_{13}$=8.7508

$d_{13}$=1.4251 $nd_B$=1.94595 $vd_8$=17.98

$r_{14}$=4.0934

$d_{14}$=0.3433

$r_{15}$=10.1848

$d_{15}$=1.1959 $nd_9$=1.61800 $vd_9$=63.39

Figure 14:
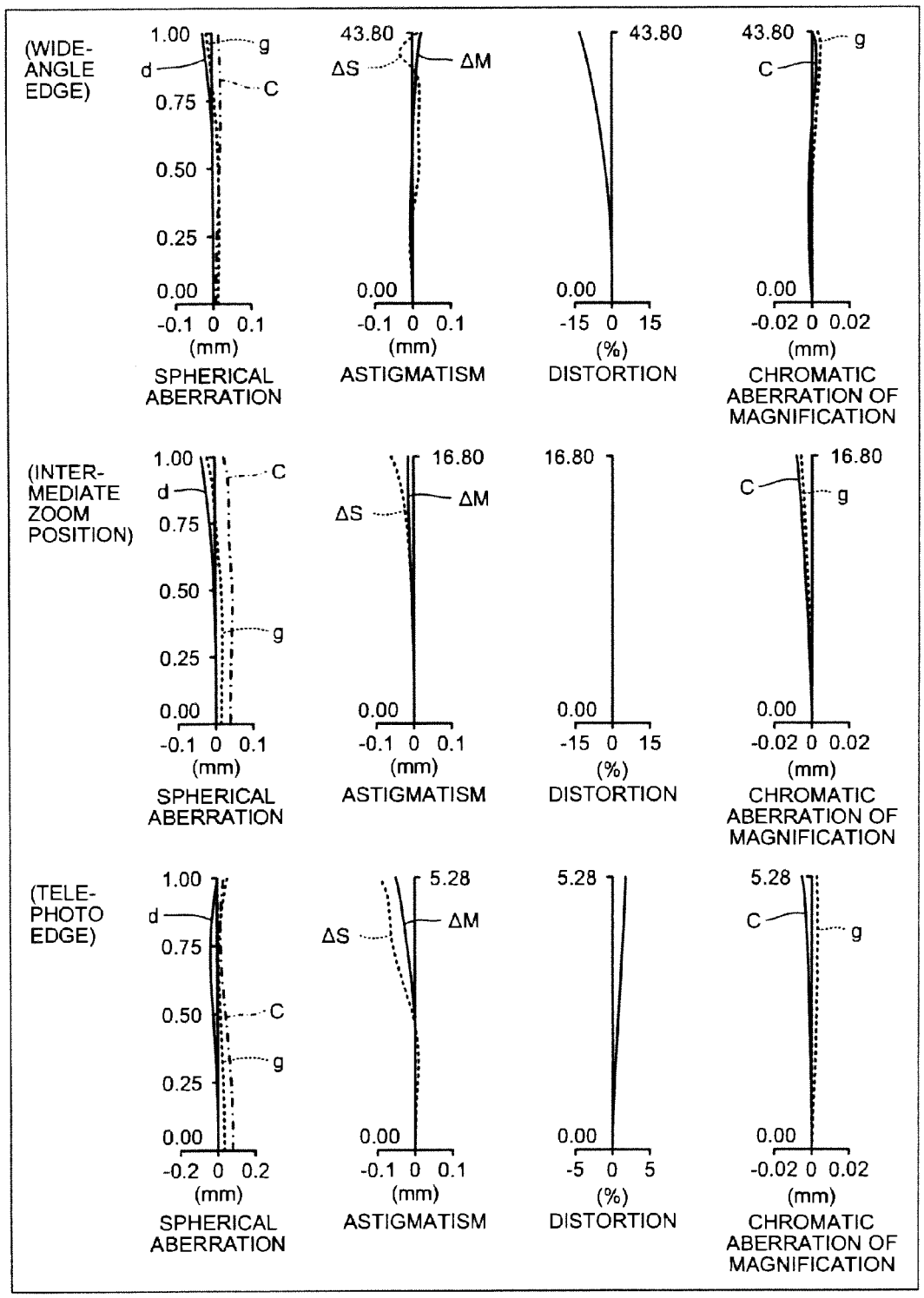
FIG. 14 is a diagram of various types of aberration of the zoom lens according to the seventh example.

$r_{16}$=−10.1848
  $d_{16}$=3.5000 (wide angle edge) to 5.7939 (intermediate zoom position) to 13.5388 (telephoto edge)
$r_{17}$=15.7815 (aspheric surface)
  $d_{17}$=1.5000 $nd_{10}$=1.55332 $vd_{10}$=71.67
$r_{18}$=−1000.0000 (aspheric surface)
  $d_{18}$=4.4707 (wide angle edge) to 7.8402 (intermediate zoom position) to 3.0627 (telephoto edge)
$r_{19}$=∞
  $d_{19}$=0.5000 $nd_{11}$=1.51680 $vd_{11}$=64.20
$r_{20}$=∞
  $d_{20}$=1.0081 (wide angle edge) to 1.0126 (intermediate zoom position) to 1.0311 (telephoto edge)
$r_{21}$=∞ (image plane)
Constant of cone (k), and Aspheric coefficients (A, B, C, D)
(Sixth Plane)
K=0,
A=1.16028×10$^{-4}$, B=−4.00446×10$^{-5}$,
C=9.99964×10$^{-7}$, D=−7.76320×10$^{-9}$
(Seventh Plane)
K=−0.1858,
A=6.53494×10$^{-4}$, B=2.25949×10$^{-5}$,
C=−7.88249×10$^{-6}$, D=7.04313×10$^{-9}$
(Tenth Plane)
K=0,
A=−5.92227×10$^{-4}$, B=4.38745×10$^{-6}$,
C=1.94199×10$^{-7}$, D=−1.48702×10$^{-9}$
(Twelfth Plane)
K=−0.5353,
A=9.52249×10$^{-6}$, B=4.17341×10$^{-5}$,
C=−8.84871×10$^{-6}$, D=1.17972×10$^{-6}$
(Seventeenth Plane)
K=−1.6970,
A=−6.34973×10$^{-4}$, B=3.53883×10$^{-5}$,
C=−2.81373×10$^{-6}$, D=3.86441×10$^{-8}$
(Eighteenth Plane)
K=0,
A=−6.44317×10$^{-4}$, B=1.51939×10$^{-5}$,
C=−1.68208×10$^{-6}$, D=1.60171×10$^{-8}$ FIG. 14 is a diagram of various types of aberration of the zoom lens according to the seventh example. In the diagram "g", "d", and "c" respectively represent aberrations for wavelengths corresponding to g-line (λ=435.83 nm), d-line (λ=587.56 nm), and c-line (λ=656.27 nm). In a portion of FIG. 14 indicating astigmatism, ΔS and ΔM represent aberration with respect to a sagittal image plane and a meridional image plane, respectively.

Figure 15:
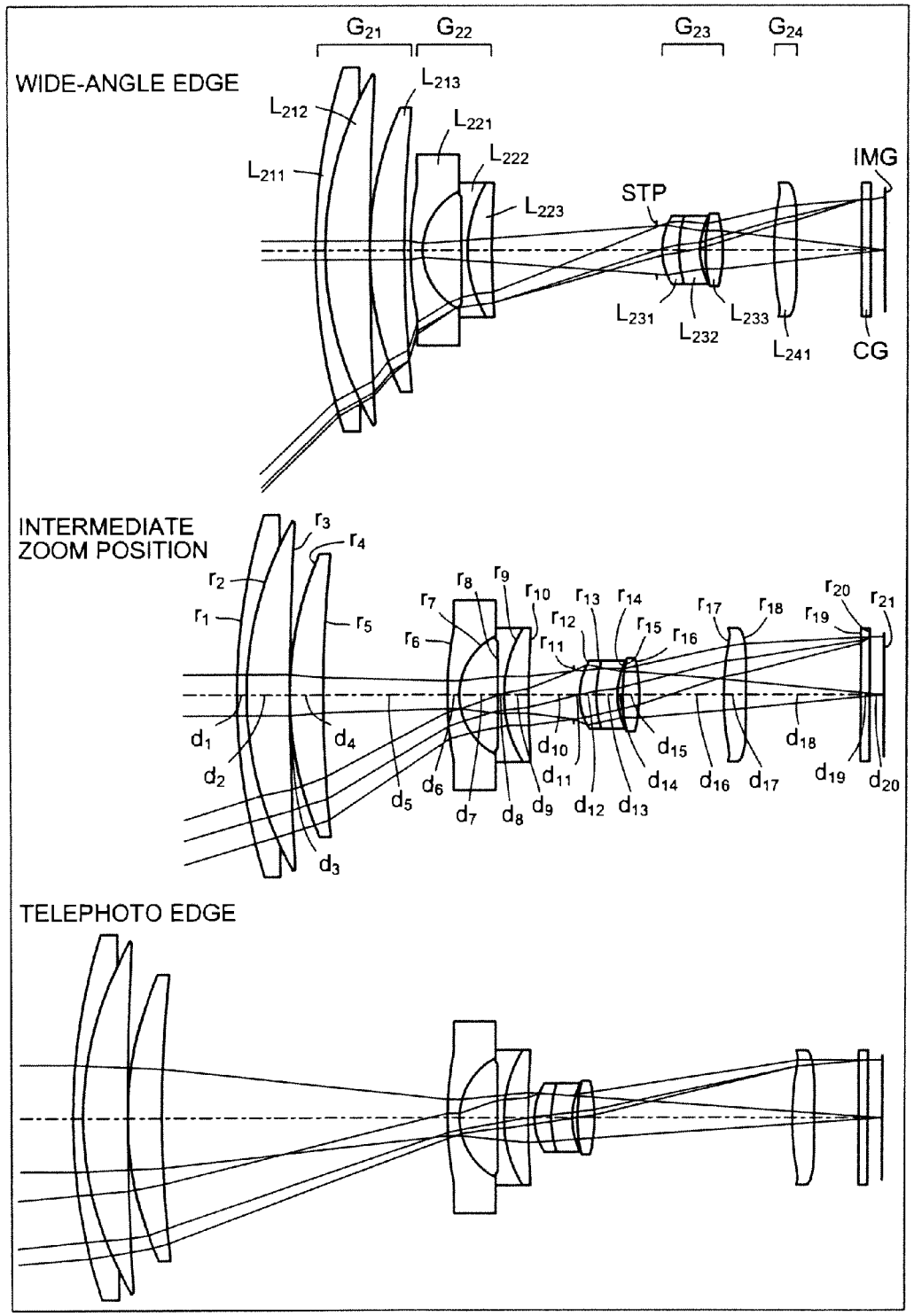
FIG. 15 is a cross sectional view (along the optical axis) of a zoom lens according to an eighth example.

FIG. 15 is a cross sectional view (along the optical axis) of a zoom lens according to an eighth example. The zoom lens includes, sequentially from the non-depicted object side, a positive first lens group $G_{21}$, a negative second lens group $G_{22}$, a positive third lens group $G_{23}$, and a positive fourth lens group $G_{24}$. Further, a diaphragm STP is disposed between the second lens group $G_{22}$ and the third lens group $G_{23}$. A cover glass CG (or filter) is disposed between the fourth lens group $G_{24}$ and the imaging plane IMG. The cover glass CG (or filter) is disposed as needed and may be omitted when not necessary. Further, at the imaging plane IMG, the optical receiving surface of an imaging element such as a CCD, a CMOS, etc. is disposed.

The first lens group $G_{21}$ includes sequentially from the object side, a negative lens $L_{211}$, a positive lens $L_{212}$, and a positive lens $L_{213}$. The negative lens $L_{211}$ and the positive lens $L_{212}$ are cemented together.

The second lens group $G_{22}$ includes sequentially from the object side, a negative lens $L_{221}$ (first negative lens), a negative lens $L_{222}$ (second negative lens), and a positive lens $L_{223}$.

Both surfaces of the negative lens $L_{221}$ and a surface on the imaging plane IMG side of the positive lens $L_{223}$ are aspheric. Further, the negative lens $L_{222}$ and the positive lens $L_{223}$ are cemented together.

The third lens group $G_{23}$ includes sequentially from the object side, a positive lens $L_{231}$, a negative lens $L_{232}$, and a positive lens $L_{233}$. A surface on the object side of the positive lens $L_{231}$ is aspheric. Further, the positive lens $L_{231}$ and the negative lens $L_{232}$ are cemented together.

The fourth lens group $G_{24}$ includes a positive lens $L_{241}$. Both surfaces of the positive lens $L_{241}$ are aspheric.

The zoom lens zooms from the wide angle edge to the telephoto edge by moving the first lens group $G_{21}$, the second lens group $G_{22}$, and the third lens group $G_{23}$ along the optical axis. Furthermore, the zoom lens corrects imaging plane (image location) variation accompanying zoom and focuses the image, by moving the fourth lens group $G_{24}$ along the optical axis.

Various values related to the zoom lens according to the eighth example are indicated below.

Focal length of zoom lens system=4.378 (wide angle edge) to 13.059 (intermediate zoom position) to 40.991 (telephoto edge)
F number=3.58 (wide angle edge) to 4.82 (intermediate zoom position) to 5.66 (telephoto edge)
Angle of view (2ω)=87.4° (wide angle edge) to 33.12° (intermediate zoom position) to 10.56° (telephoto edge)
(Values Related to Conditional Expression (7))
Average Abbe number with respect to d-line of positive lenses (positive lens $L_{212}$, positive lens $L_{213}$) in the first lens group $G_{21}$ (λdP1)=55.3500
Average refraction index with respect to d-line of positive lenses (positive lens $L_{212}$, positive lens $L_{213}$) in the first lens group $G_{21}$ (NdP1)=1.7030
λdP1/NdP1=32.50
(Values Related to Conditional Expression (8))
Abbe number with respect to d-line of second negative lens (negative lens $L_{222}$) (λdM2)=49.6000
Refractive index with respect to d-line of second negative lens (negative lens $L_{222}$) (NdM2)=1.7725
λdM2/NdM2=27.98
(Values Related to Conditional Expression (9))
Abbe number with respect to d-line of positive lens (positive lens $L_{231}$) that among lenses of the third lens group $G_{23}$, is farthest on object side (λdP3)=40.7000
Refractive index with respect to d-line of positive lens (positive lens $L_{231}$) that among lenses of the third lens group $G_{23}$, is farthest on object side (NdP3)=1.8061
(λdM2/NdM2)−(λdP3/NdP3)=5.45
(Values Related to Conditional Expression (10))
Deviation of paraxial curvature radius at height that is 10% of effective diameter of aspheric surface on the imaging plane IMG side of positive lens $L_{223}$ in the second lens group $G_{22}$ and the aspheric shape (S10)=−0.0909
Height of 10% of effective diameter of the aspheric surface on the imaging plane IMG side of the positive lens $L_{223}$ in the second lens group $G_{22}$ (H10)=3.6
S10/H10=−0.0253
$r_1$=35.3665
  $d_1$=0.7000 $nd_1$=1.92286 $vd_1$=20.88
$r_2$=22.7365
  $d_2$=2.8303 $nd_2$=1.61800 $vd_2$=63.39
$r_3$=94.1318
  $d_3$=0.1500

Figure 16:
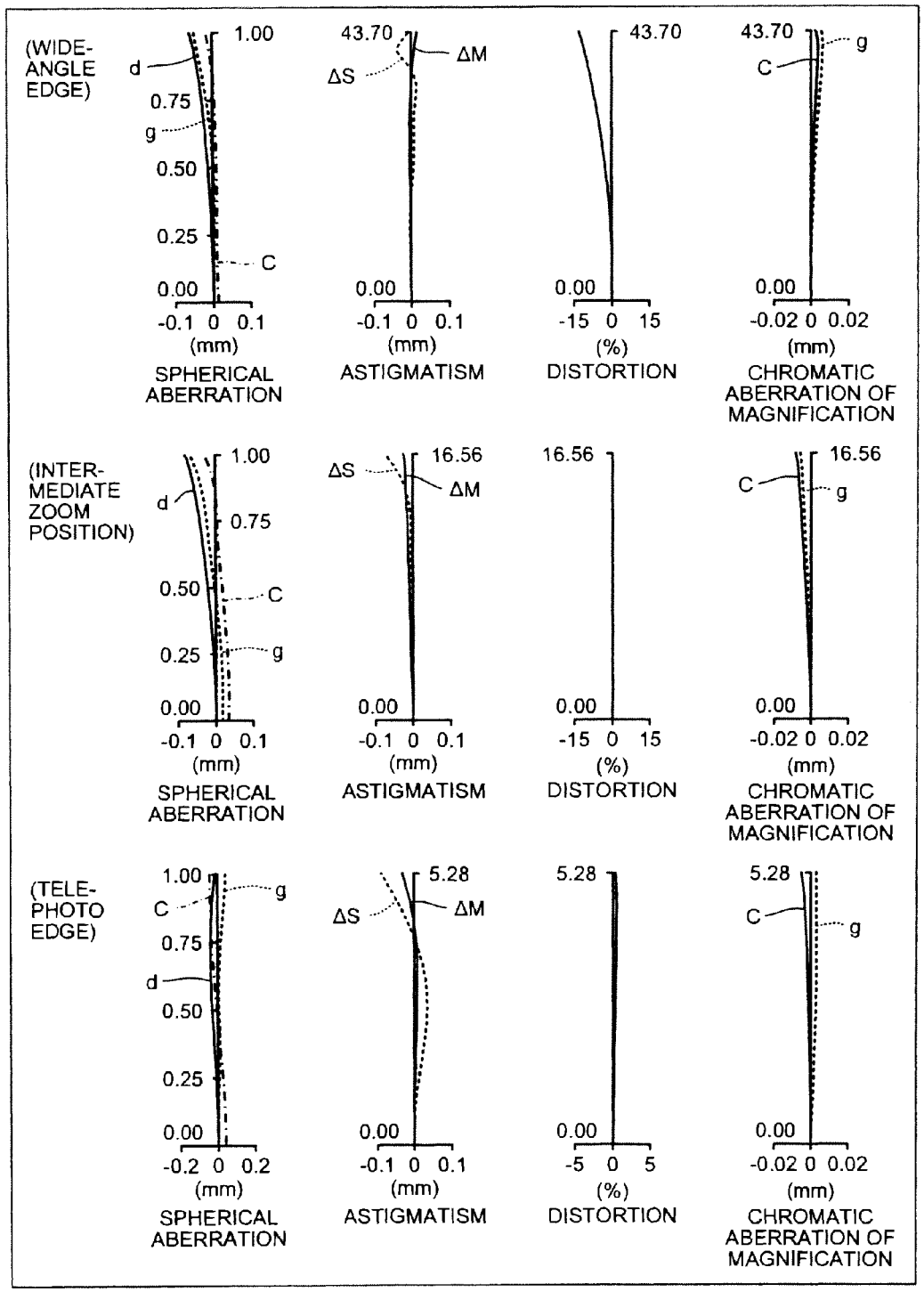
FIG. 16 is a diagram of various types of aberration of the zoom lens according to the eighth example.

$r_4 = 22.1345$
  $d_4 = 2.1521$ $nd_3 = 1.78800$ $vd_3 = 47.49$
$r_5 = 57.3854$
  $d_5 = 0.5000$ (wide angle edge) to 8.0817 (intermediate zoom position) to 19.4548 (telephoto edge)
$r_6 = 19.8247$ (aspheric surface)
  $d_6 = 0.8000$ $nd_4 = 1.85639$ $vd_4 = 40.10$
$r_7 = 4.0732$ (aspheric surface)
  $d_7 = 2.6721$
$r_8 = 701.8212$
  $d_8 = 0.4500$ $nd_5 = 1.77250$ $vd_5 = 49.62$
$r_9 = 8.1000$
  $d_9 = 1.6506$ $nd_6 = 2.01390$ $vd_6 = 19.32$
$r_{10} = 27.7772$ (aspheric surface)
  $d_{10} = 11.0131$ (wide angle edge) to 3.0593 (intermediate zoom position) to 0.1500 (telephoto edge)
$r_{11} = \infty$ (diaphragm)
  $d_{11} = 0.3500$
$r_{12} = 4.6428$ (aspheric surface)
  $d_{12} = 1.3959$ $nd_7 = 1.80610$ $vd_7 = 40.74$
$r_{13} = 9.1218$
  $d_{13} = 1.2040$ $nd_8 = 1.94595$ $vd_8 = 17.98$
$r_{14} = 4.3311$
  $d_{14} = 0.3125$
$r_{15} = 9.9065$
  $d_{15} = 1.2138$ $nd_9 = 1.61800$ $vd_9 = 63.39$
$r_{16} = -9.9065$
  $d_{16} = 4.2017$ (wide angle edge) to 7.1778 (intermediate zoom position) to 13.6497 (telephoto edge)
$r_{17} = 16.9814$ (aspheric surface)
  $d_{17} = 1.5000$ $nd_{10} = 1.55516$ $vd_{10} = 71.67$
$r_{18} = -224.2761$ (aspheric surface)
  $d_{18} = 4.1129$ (wide angle edge) to 7.3262 (intermediate zoom position) to 3.4643 (telephoto edge)
$r_{19} = \infty$
  $d_{19} = 0.5000$ $nd_{11} = 1.51680$ $vd_{11} = 64.20$
$r_{20} = \infty$
  $d_{20} = 1.0090$ (wide angle edge) to 0.9591 (intermediate zoom position) to 0.8904 (telephoto edge)
$r_{21} = \infty$ (image plane)
Constant of cone (k), and Aspheric coefficients (A, B, C, D)
(Sixth Plane)
$K = 0$,
$A = 1.09571 \times 10^{-4}$, $B = -2.97768 \times 10^{-5}$,
$C = 6.21695 \times 10^{-7}$, $D = -3.72502 \times 10^{-9}$
(Seventh Plane)
$K = -0.1858$,
$A = 7.30061 \times 10^{-4}$, $B = 3.77662 \times 10^{-6}$,
$C = -3.03192 \times 10^{-6}$, $D = -1.86011 \times 10^{-7}$
(Tenth Plane)
$K = 0$,
$A = -6.01399 \times 10^{-4}$, $B = 3.30880 \times 10^{-6}$,
$C = 1.07326 \times 10^{-7}$, $D = -4.56889 \times 10^{-10}$
(Twelfth Plane)
$K = -0.5322$,
$A = 2.34771 \times 10^{-5}$, $B = 1.08796 \times 10^{-5}$,
$C = -1.60048 \times 10^{-6}$, $D = 5.07288 \times 10^{-7}$
(Seventeenth Plane)
$K = -4.3209$,
$A = -6.78620 \times 10^{-4}$, $B = 3.28433 \times 10^{-5}$,
$C = -1.41788 \times 10^{-6}$, $D = -9.87708 \times 10^{-9}$
(Eighteenth Plane)
$K = 0$,
$A = -8.87070 \times 10^{-4}$, $B = 3.42669 \times 10^{-5}$,
$C = -1.76375 \times 10^{-6}$, $D = 3.39007 \times 10^{-9}$ FIG. 16 is a diagram of various types of aberration of the zoom lens according to the eighth example. In the diagram "g", "d", and "c" respectively represent aberrations for wavelengths corresponding to g-line ($\lambda = 435.83$ nm), d-line ($\lambda = 587.56$ nm), and c-line ($\lambda = 656.27$ nm). In a portion of FIG. 16 indicating astigmatism, $\Delta S$ and $\Delta M$ represent aberration with respect to a sagittal image plane and a meridional image plane, respectively.

Figure 17:
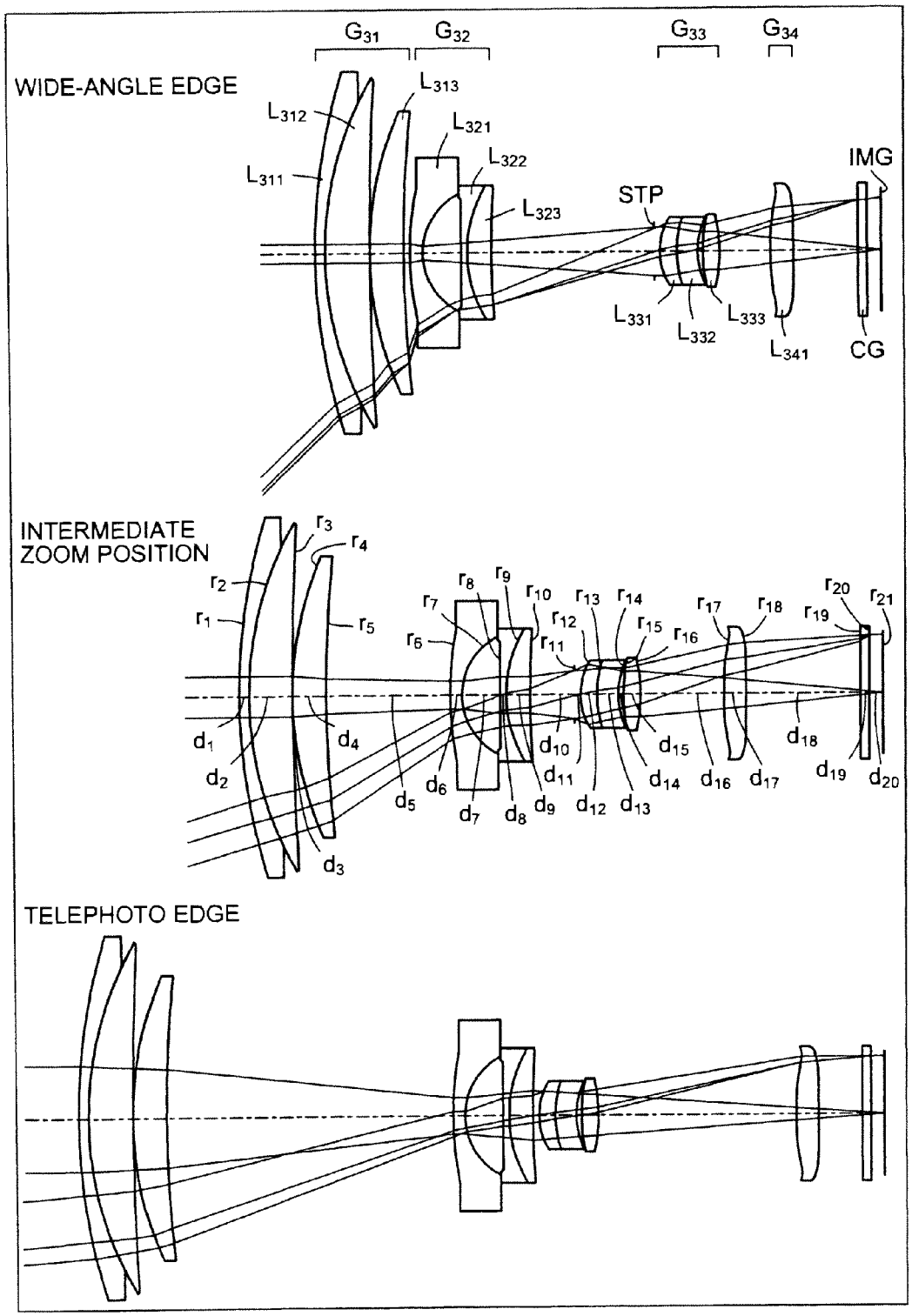
FIG. 17 is a cross sectional view (along the optical axis) of a zoom lens according to a ninth example.

FIG. 17 is a cross sectional view (along the optical axis) of a zoom lens according to a ninth example. The zoom lens includes, sequentially from the non-depicted object side, a positive first lens group $G_{31}$, a negative second lens group $G_{32}$, a positive third lens group $G_{33}$, and a positive fourth lens group $G_{34}$. Further, a diaphragm STP is disposed between the second lens group $G_{32}$ and the third lens group $G_{33}$. A cover glass CG (or filter) is disposed between the fourth lens group $G_{34}$ and the imaging plane IMG. The cover glass CG (or filter) is disposed as needed and may be omitted when not necessary. Further, at the imaging plane IMG, the optical receiving surface of an imaging element such as a CCD, a CMOS, etc. is disposed.

The first lens group $G_{31}$ includes sequentially from the object side, a negative lens $L_{311}$, a positive lens $L_{312}$, and a positive lens $L_{313}$. The negative lens $L_{311}$ and the positive lens $L_{312}$ are cemented together.

The second lens group $G_{32}$ includes sequentially from the object side, a negative lens $L_{321}$ (first negative lens), a negative lens $L_{322}$ (second negative lens), and a positive lens $L_{323}$. Both surfaces of the negative lens $L_{321}$ and a surface on the imaging plane IMG side of the positive lens $L_{323}$ are aspheric. Further, the negative lens $L_{322}$ and the positive lens $L_{323}$ are cemented together.

The third lens group $G_{33}$ includes sequentially from the object side, a positive lens $L_{331}$, a negative lens $L_{332}$, and a positive lens $L_{333}$. A surface on the object side of the positive lens $L_{331}$ is aspheric. Further, the positive lens $L_{331}$ and the negative lens $L_{332}$ are cemented together.

The fourth lens group $G_{34}$ includes a positive lens $L_{341}$. Both surfaces of the positive lens $L_{341}$ are aspheric.

The zoom lens zooms from the wide angle edge to the telephoto edge by moving the first lens group $G_{31}$, the second lens group $G_{32}$, and the third lens group $G_{33}$ along the optical axis. Furthermore, the zoom lens corrects imaging plane (image location) variation accompanying zoom and focuses the image, by moving the fourth lens group $G_{34}$ along the optical axis.

Various values related to the zoom lens according to the ninth example are indicated below.

Focal length of zoom lens system = 4.381 (wide angle edge) to 13.307 (intermediate zoom position) to 41.113 (telephoto edge)

F number = 3.60 (wide angle edge) to 4.82 (intermediate zoom position) to 5.71 (telephoto edge)

Angle of view ($2\omega$) = 87.4° (wide angle edge) to 33.12° (intermediate zoom position) to 10.56° (telephoto edge)

(Values Related to Conditional Expression (7))
Average Abbe number with respect to d-line of positive lenses (positive lens $L_{312}$, positive lens $L_{313}$) in the first lens group $G_{31}$ ($\lambda dP1$) = 55.3500
Average refraction index with respect to d-line of positive lenses (positive lens $L_{312}$, positive lens $L_{313}$) in the first lens group $G_{31}$ (NdP1) = 1.7030
$\lambda dP1/NdP1 = 32.50$
(Values Related to Conditional Expression (8))
Abbe number with respect to d-line of second negative lens (negative lens $L_{322}$) ($\lambda dM2$) = 49.6000

Refractive index with respect to d-line of second negative lens (negative lens $L_{322}$) (NdM2)=1.7725
λdM2/NdM2=27.98
(Values Related to Conditional Expression (9))
Abbe number with respect to d-line of positive lens (positive lens $L_{331}$) that among lenses of the third lens group $G_{33}$, is farthest on object side (λdP3)=40.7000
Refractive index with respect to d-line of positive lens (positive lens $L_{331}$) that among lenses of the third lens group $G_{33}$, is farthest on object side (NdP3)=1.8061
(λdM2/NdM2)−(λdP3/NdP3)=5.45
(Values Related to Conditional Expression (10))
Deviation of paraxial curvature radius at height that is 10% of the effective diameter of aspheric surface on the imaging plane IMG side of the positive lens $L_{323}$ in the second lens group $G_{32}$ and the aspheric shape (S10)=−0.0893
Height of 10% of effective diameter of the aspheric surface on the imaging plane IMG side of the positive lens $L_{323}$ in the second lens group $G_{32}$ (H10)=3.5
S10/H10=−0.0255
$r_1$=33.2686
  $d_1$=0.8000 $nd_1$=1.84666 $vd_1$=23.78
$r_2$=19.8000
  $d_2$=3.0214 $nd_2$=1.61800 $vd_2$=63.39
$r_3$=80.0497
  $d_3$=0.1500
$r_4$=24.5713
  $d_4$=2.2786 $nd_3$=1.78800 $vd_3$=47.49
$r_5$=78.2687
  $d_5$=0.5000 (wide angle edge) to 9.5000 (intermediate zoom position) to 19.6766 (telephoto edge)
$r_6$=25.2886 (aspheric surface)
  $d_6$=0.8000 $nd_4$=1.85135 $vd_4$=40.10
$r_7$=4.1057 (aspheric surface)
  $d_7$=2.4507
$r_8$=562.3556
  $d_8$=0.4500 $nd_5$=1.77250 $vd_5$=49.62
$r_9$=8.5000
  $d_9$=1.5324 $nd_6$=2.00170 $vd_6$=19.32
$r_{10}$=31.7164 (aspheric surface)
  $d_{10}$=10.4212 (wide angle edge) to 3.2143 (intermediate zoom position) to 0.1500 (telephoto edge)
$r_{11}$=∞ (diaphragm)
  $d_{11}$=0.3500
$r_{12}$=4.6699 (aspheric surface)
  $d_{12}$=1.1969 $nd_7$=1.80610 $vd_7$=40.74
$r_{13}$=9.2400
  $d_{13}$=1.3621 $nd_8$=1.94595 $vd_8$=17.98
$r_{14}$=4.4271
  $d_{14}$=0.3144
$r_{15}$=10.8758
  $d_{15}$=1.2266 $nd_9$=1.61800 $vd_9$=63.39
$r_{16}$=−9.1157
  $d_{16}$=4.0000 (wide angle edge) to 7.1658 (intermediate zoom position) to 13.6403 (telephoto edge)
$r_{17}$=17.2904 (aspheric surface)
  $d_{17}$=1.5000 $nd_{10}$=1.59201 $vd_{10}$=67.02
$r_{18}$=−500.0000 (aspheric surface)
  $d_{18}$=3.6718 (wide angle edge) to 6.6915 (intermediate zoom position) to 3.2000 (telephoto edge)
$r_{19}$=∞
  $d_{19}$=0.5000 $nd_{11}$=1.51680 $vd_{11}$=64.20
$r_{20}$=∞
  $d_{20}$=1.6130 (wide angle edge) to 1.0391 (intermediate zoom position) to 1.0475 (telephoto edge)
$r_{21}$=∞ (image plane)

Figure 18:
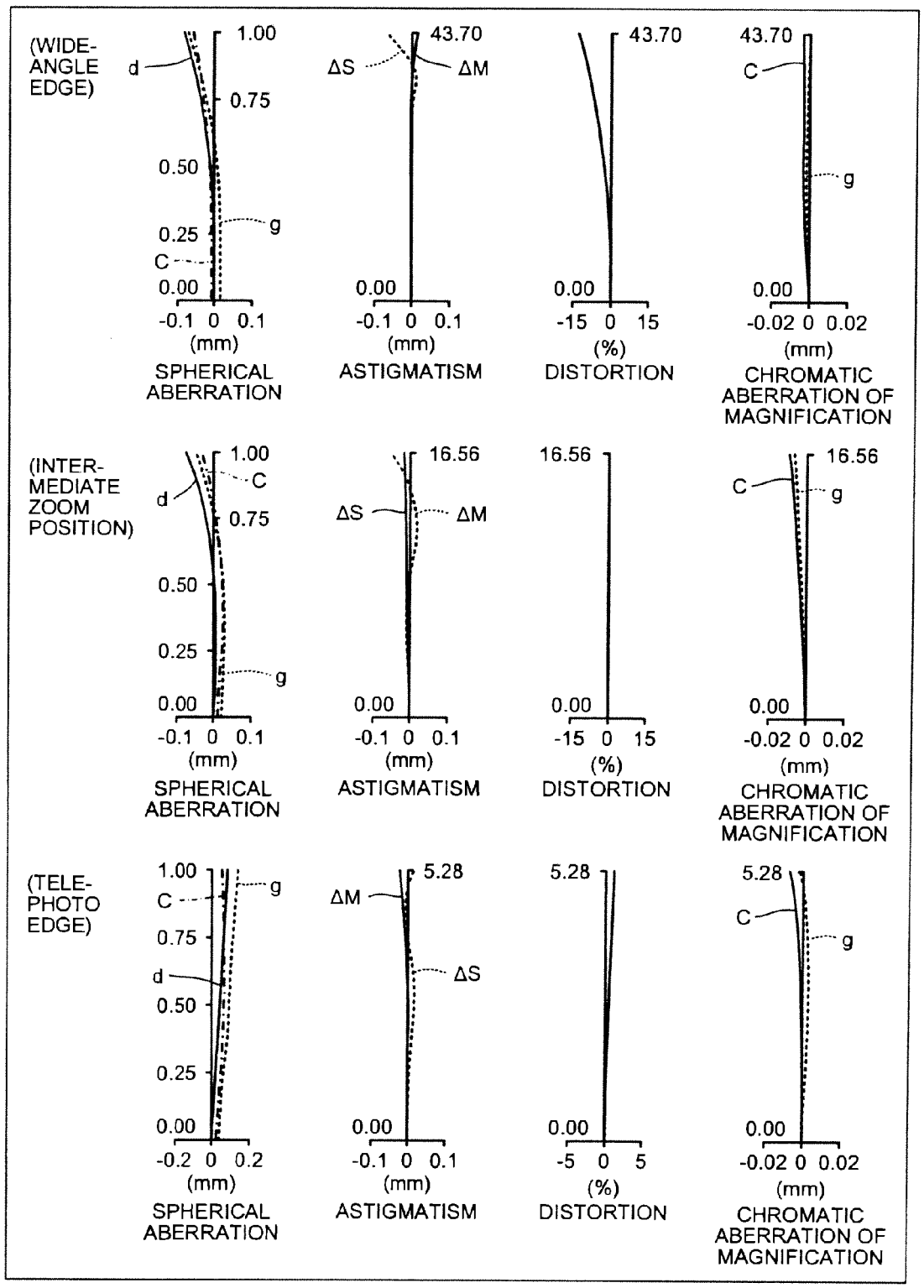
FIG. 18 is a diagram of various types of aberration of the zoom lens according to the ninth example.

Constant of cone (k), and Aspheric coefficients (A, B, C, D)
(Sixth Plane)
K=0,
A=1.70699×10$^{-4}$, B=−3.32288×10$^{-5}$,
C=7.95002×10$^{-7}$, D=−6.27099×10$^{-9}$
(Seventh Plane)
K=−0.1858,
A=8.43675×10$^{-4}$, B=6.56293×10$^{-6}$,
C=−2.00670×10$^{-6}$, D=−2.29541×10$^{-7}$
(Tenth Plane)
K=0,
A=−5.64411×10$^{-4}$, B=−1.75974×10$^{-5}$,
C=1.70798×10$^{-6}$, D=−3.89949×10$^{-8}$
(Twelfth Plane)
K=−0.5973,
A=−1.92725×10$^{-5}$, B=8.22671×10$^{-5}$,
C=−2.28281×10$^{-5}$, D=2.78115×10$^{-6}$
(Seventeenth Plane)
K=1.6141,
A=−5.92164×10$^{-4}$, B=1.68205×10$^{-5}$,
C=−7.73392×10$^{-7}$, D=−2.40077×10$^{-8}$
(Eighteenth Plane)
K=0,
A=−6.47064×10$^{-4}$, B=2.16671×10$^{-5}$,
C=−1.42681×10$^{-6}$, D=−6.03161×10$^{-10}$ FIG. 18 is a diagram of various types of aberration of the zoom lens according to the ninth example. In the diagram "g", "d", and "c" respectively represent aberrations for wavelengths corresponding to g-line (λ=435.83 nm), d-line (λ=587.56 nm), and c-line (λ=656.27 nm). In a portion of FIG. 18 indicating astigmatism, ΔS and ΔM represent aberration with respect to a sagittal image plane and a meridional image plane, respectively.

Among the values for the examples above, $r_1$, $r_2$, . . . indicate radii of curvature for each lens, diaphragm surface, etc.; $d_1$, $d_2$, . . . indicate the thickness of the lenses, diaphragm, etc. or the distance between surfaces thereof; $nd_1$, $nd_2$, . . . indicate the refraction index of each lens with respect to the d-line (λ=587.56 nm); $v_1$, $vd_2$, . . . indicate the Abbe number with respect to the d-line (λ=587.56 nm) of each lens.

Each of the aspheric surfaces above can be expressed by the equation hereinafter, where Z=the depth of the aspheric surface, y=the height from the optical axis, and the direction of travel of light is positive.

$$Z = \frac{y^2}{R\left(1 + \sqrt{1 - (1+K)y/R^2}\right)^2} + Ay^4 + By^6 + Cy^8 + Dy^{10} \quad [1]$$

Where, R is paraxial radii of curvature; K is constant of the cone; and A, B, C, D are the fourth, sixth, eighth, and tenth aspheric coefficients, respectively.

As described above, the zoom lens according to each of the examples above is able to have a wide angle of view of 80° or greater, high optical performance, a thinner retracted-state size, and a zoom ratio of 8 or greater by satisfying the conditional expressions above. Further, since a lens having a suitable aspheric surface is employed, the zoom lens according to each of the examples can maintain satisfactory optical performance with fewer lenses.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A zoom lens comprising, sequentially from an object side:
    a positive first lens group;
    a negative second lens group;
    a positive third lens group; and
    a positive fourth lens group,
    wherein $2.0 \leq D23W/FW \leq 3.0$ is satisfied, D23W being an interval, at a wide angle edge, between a lens that among lenses of the second lens group, is farthest on an imaging plane side and a lens that among lenses of the third lens group, is farthest on the object side, FW being a focal length of an optical system of the zoom lens at infinity focus, at the wide angle edge, and
    wherein $15 \leq (TaW+TaT)/(\tan(\omega W) \times Ymax) \leq 33$ is satisfied, TaW being a total length of the optical system, at the wide angle, from a surface farthest on the object side to an imaging plane edge, TaT being a total length of the optical system, at a telephoto edge, from the surface farthest on the object side to an imaging plane, $\omega W$ being a half angle of view of the optical system, at the wide angle edge, and Ymax being a maximum paraxial image height at the wide angle edge.

2. The zoom lens according to claim 1, wherein $5.7 \leq |F1/F2| \leq 10$ is satisfied, F1 being a focal length of the first lens group and F2 being a focal length of the second lens group.

3. A zoom lens comprising, sequentially from an object side:
    a positive first lens group;
    a negative second lens group;
    a positive third lens group; and
    a positive fourth lens group, wherein $3.5 \leq \Sigma D/(\tan(\omega W) \times Ymax) \leq 5.5$ is satisfied, $\Sigma D$ being a total thickness along an optical axis of the first, the second, the third, and the fourth lens groups, $\omega W$ being a half angle of view of an optical system of the zoom lens, at a wide angle edge, and Ymax being a maximum paraxial image height at the wide angle edge.

4. The zoom lens according to claim 3, wherein $8.0 \leq |F2 \times F3|/FW \leq 15$ is satisfied, F2 being a focal length of the second lens group, F3 being a focal length of the third lens group, and FW being a focal length of the optical system at infinity focus, at the wide angle edge.

5. The zoom lens according to claim 3, wherein $5.0 \leq |F2 \times D2|/Ymax \leq 10$ is satisfied, F2 being the focal length of the second lens group, D2 being a thickness along an optical axis of the second lens group, and Ymax being the maximum paraxial image height at the wide angle edge.

6. The zoom lens according to claim 4, wherein $5.0 \leq |F2 \times D2|/Ymax \leq 10$ is satisfied, F2 being the focal length of the second lens group, D2 being the thickness along an optical axis of the second lens group, and Ymax being the maximum paraxial image height at the wide angle edge.

7. A zoom lens comprising, sequentially from an object side:
    a positive first lens group;
    a negative second lens group;
    a positive third lens group; and
    a positive fourth lens group,
    wherein the first lens group includes plural positive lenses, and $25 \leq \lambda dP1/NdP1 \leq 35$ is satisfied, $\lambda dP1$ being an average Abbe number with respect to a d-line of the positive lenses of the first lens group and NdP1 being an average refractive index with respect to the d-line of the positive lenses of the first lens group, and
    wherein the second lens group includes a first negative lens and a second negative lens, and $20 \leq \lambda dM2/NdM2 \leq 31$ is satisfied, $\lambda dM2$ being an Abbe number with respect to a d-line of the second negative lens and NdM2 being a refractive index with respect to the d-line of the second negative lens.

8. The zoom lens according to claim 7, wherein the second lens group includes sequentially from the object side, the first negative lens and the second negative lens,
    the third lens group includes plural positive lenses, and $2 \leq (\lambda dM2/NdM2)-(\lambda dP3/NdP3) \leq 12$ is satisfied, $\lambda dM2$ being the Abbe number with respect to the d-line of the second negative lens, NdM2 being the refractive index with respect to the d-line of the second negative lens, $\lambda dP3$ being an Abbe number with respect to a d-line of a positive lens that is farthest on the object side among the positive lenses of the third lens group, and NdP3 is a refractive index with respect to the d-line of the positive lens that is farthest on the object side among the lenses of the third lens group.

9. A zoom lens comprising, sequentially from an object side:
    a positive first lens group;
    a negative second lens group;
    a positive third lens group; and
    a positive fourth lens group,
    wherein $2.0 \leq D23W/FW \leq 2.64$ is satisfied, D23W being an interval, at a wide angle edge, between a lens that among lenses of the second lens group, is farthest on an imaging plane side and a lens that among lenses of the third lens group, is farthest on the object side, FW being a focal length of an optical system of the zoom lens at infinity focus, at the wide angle edge.

10. A zoom lens comprising, sequentially from an object side:
    a positive first lens group;
    a negative second lens group;
    a positive third lens group; and
    a positive fourth lens group,
    wherein the first lens group includes plural positive lenses, and $29.73 \leq \lambda dP1/NdP1 \leq 35$ is satisfied, $\lambda dP1$ being an average Abbe number with respect to a d-line of the positive lenses of the first lens group and NdP1 being an average refractive index with respect to the d-line of the positive lenses of the first lens group.

* * * * *